United States Patent
Carneal et al.

(10) Patent No.: US 7,519,502 B1
(45) Date of Patent: Apr. 14, 2009

(54) SURFACE PROFILE MEASUREMENT PROCESSING METHOD

(75) Inventors: Jason Bradley Carneal, Silver Spring, MD (US); Paisan Atsavapranee, Cabin John, MD (US); Jerry Wei-Jen Shan, Raritan, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/726,197

(22) Filed: Mar. 14, 2007

Related U.S. Application Data

(63) Continuation-in-part of application No. 10/932,648, filed on Sep. 2, 2004, now Pat. No. 7,196,777.

(60) Provisional application No. 60/784,964, filed on Mar. 22, 2006, provisional application No. 60/500,235, filed on Sep. 5, 2003.

(51) Int. Cl.
  *G01B 7/28* (2006.01)
(52) U.S. Cl. .................. 702/167; 702/168; 33/503; 33/636; 356/601; 700/258; 73/105
(58) Field of Classification Search ............... 702/95, 702/167, 168, 166, 150; 33/502, 501, 503, 33/554, 636, 559, 832; 356/511, 601, 604, 356/603, 607; 700/195, 258; 382/108, 286; 73/105

See application file for complete search history.

(56) References Cited

U.S. PATENT DOCUMENTS

| | | | | |
|---|---|---|---|---|
| 5,193,120 | A * | 3/1993 | Gamache et al. | 382/286 |
| 5,517,575 | A * | 5/1996 | Ladewski | 382/108 |
| 6,100,980 | A * | 8/2000 | Ichikawa | 356/511 |
| 6,542,249 | B1 * | 4/2003 | Kofman et al. | 356/601 |
| 6,952,270 | B2 * | 10/2005 | Shirley | 356/603 |
| 7,039,550 | B2 * | 5/2006 | Noda | 702/168 |
| 7,162,383 | B2 * | 1/2007 | Takemura | 702/95 |
| 7,242,484 | B2 * | 7/2007 | Shirley | 356/604 |
| 2004/0105100 | A1 * | 6/2004 | Shirley | 356/603 |
| 2005/0214657 | A1 * | 9/2005 | Mitsui | 430/5 |
| 2006/0012802 | A1 * | 1/2006 | Shirley | 356/603 |

\* cited by examiner

*Primary Examiner*—Carol S Tsai
(74) *Attorney, Agent, or Firm*—Scott R. Boalijk; Howard Kaiser

(57) ABSTRACT

In one general aspect, a method of processing surface profile measurements includes obtaining a calibration image, the calibration image including one or more surface profile measurements at one or more discrete points on a surface, performing calibration processing on the surface profile measurements, performing data processing on the surface profile measurements, and providing data output based upon the calibration processing and the data processing.

8 Claims, 26 Drawing Sheets

RAW DATA

IDENTIFICATION OF SPOT GROUPS

$$R = [(x_n - x_1)^2 + (y_n - y_1)^2]^{1/2}$$
$$z' = a_0 + a_1 R + a_2 R^2$$

IMAGE OF CALIBRATION TARGET RECORDED AT A SLANT ANGLE. DOTS IN IMAGES DENOTE THE CENTERS OF THE MARKERS FOUND BY THE MARKER DETECTION ALGORITHM.

IMAGE OF CALIBRATION TARGET AFTER MAPPING OF THE CROSS CENTERS ONTO A REGULAR GRID. DOTS IN THE IMAGE DENOTE THE CENTERS OF THE MARKERS FOUND BY THE MARKER DETECTION ALGORITHM.

TRANSFORMED IMAGE IN REAL DOMAIN, CP SELECTION

REGION-OF-INTEREST
(ROI) MASK

FIG. 7C

SAMPLE RESULTS FROM ARRAY PROTOTYPE

SAMPLE RESULTS FROM THE BLOB ANALYSIS ALGORITHM USING A RAW IMAGE OBTAINED WITH THE MASK GLRP SYSTEM.

OUTPUT FROM GLRP SOFTWARE - LARGE WAVE RUN
WITH 15.15" SIGNIFICANT WAVE HEIGHT

SURFACE PROFILE MEASUREMENT PROCESSING METHOD

CROSS-REFERENCE TO RELATED APPLICATIONS

This application claims the benefit of U.S. Provisional Application No. 60/784,964, filed Mar. 22, 2006, and is a continuation-in-part of U.S. application Ser. No. 10/932,648, filed Sep. 2, 2004, now U.S. Pat. No. 7,196,777 B1, which claims the benefit of U.S. Provisional Application No. 60/500,235, filed Sep. 5, 2003, each of which is incorporated herein by reference.

STATEMENT OF GOVERNMENT INTEREST

The invention described herein was made in the performance of official duties by employees of the Department of the Navy, and thus may be manufactured, used, or licensed by or for the United States Government for governmental purposes without the payment of any royalties thereon.

TECHNICAL FIELD

The present invention relates generally to surface profile measurement, and in particular to a surface profile measurement processing method for complex three-dimensional surfaces.

BACKGROUND

Experimental measurement of surface profiles, such as surface-wave elevation profiles, is important for many free-surface flow studies. With the increasing use of computational tools in connection with complex nonlinear wave dynamics around surface vessels in deep-ocean and coastal regions, time-resolved three-dimensional surface-wave data is important in model development and in the validation of flow solutions. For instance, wave-induced motions of a surface ship in severe weather can cause passenger discomfort, large hull loads, cargo damage, and even can cause the ship to capsize. Current ship motion prediction programs typically consider various components of external forces, including hydrostatic restoring and Froude-Krylov wave forces, radiation and diffraction forces, viscous roll damping, and appendage forces from propellers, bilge keels, rudders and fins. Usually, each of the components of forces is computed separately and linearly superposed to yield total forces and moments. In cases where nonlinear wave interactions are significant, it is necessary to develop more sophisticated models and to validate predictions using experimental data on the wave field around the ship and associated six-degree-of-freedom ship motions. The problem becomes even more complex with the consideration of multi-hull designs where wave-making interaction of various waterplane sections can play a significant role in resistance and seakeeping.

In model testing, various measurement techniques, such as techniques using sonic and electromechanical devices, are used to measure surface wave elevation at a small number of discrete locations. One example of such a technique is the "whisker probe," which uses a stainless steel needle or whisker mounted on a support arm to probe the surface of the water by electrical conductivity. Upon entry of the whisker into the water, the small electrical potential on the whisker is grounded out, and a positional readout proportional to the water level is output. The probe then begins retracting the whisker out of the water until the meniscus on the needle tip breaks, at which point the whisker is again lowered into the water to begin another cycle. By keeping the whisker arm very light, data rates of up to 60 measurement cycles per second have been achieved, although operation in the 30 to 40 Hz range is more practical.

The use of electromechanical devices, such as the whisker probe, has been mostly limited to the measurement of steady wave profiles for at least two reasons. First, the mechanical design of the whisker probe does not allow the measurement of large peak-to-peak waves. Second, it is impractical to employ more than a few electro-mechanical devices simultaneously in an experiment. For many seakeeping and maneuvering problems, particularly those involving large-amplitude waves and ship motions, it is desirable to obtain dynamic measurement of the three-dimensional wave surface at a large array of points around a ship model.

Currently, there are a limited number of techniques that allow the measurement of complex three-dimensional surface of water waves. These include the measurement of surface slope by intensity-based reflection, color-encoded optical reflection, and light shadowgraphy. These techniques, however, are limited to the measurement of small wave slope over a small physical area and are not suitable for practical large-scale surface wave measurements in tow-tank facilities.

SUMMARY

Global Laser Rangefinder Profilometry (GLRP) is a novel optical technique for instantaneous planar measurement of complex three-dimensional surfaces. A GLRP system uses the integration of hardware and software to produce accurate three dimensional measurements of a surface that may be seeded with fluorescent dye. The described techniques may be used to measure wave surfaces, as well as to measure other surfaces, including surfaces to which fluorescent coatings can be applied. This description focuses processing techniques that may be implemented in software and/or hardware and may be used to process the raw images taken by the GLRP system and produce measurement output, such as output in global tank coordinates.

In one general aspect, a method of processing surface profile measurements includes obtaining a calibration image, the calibration image including one or more surface profile measurements at one or more discrete points on a surface, performing calibration processing on the surface profile measurements, performing data processing on the surface profile measurements, and providing data output based upon the calibration processing and the data processing.

Implementations may include one or more of the following. For example, the calibration processing may include performing surface displacement calibration processing on the surface profile measurements and performing X-Y mapping calibration processing on the surface profile measurements. The calibration processing may yield a mask image and at least one calibration curve for one or more of the points on the surface. The data processing may include performing image preprocessing, performing blob analysis, performing coordinate mapping, and performing post processing. The image preprocessing may include preparing a region of interest mask and applying the region of interest mask to raw data obtained for one or more of the points on the surface. The blob analysis may include identifying at least one blob, calculating a centroid for the identified blobs, and assigning an index number to the identified blobs. The post processing may include eliminating spurious data and interpolating raw data to a regular grid. In addition, the method may include displaying the data output in a visual display.

In another general aspect, a computer readable storage medium has embodied thereon a computer program. The computer program includes an image obtaining code segment for obtaining a calibration image, where the calibration image includes one or more surface profile measurements at one or more discrete points on a surface, a calibration processing code segment for performing calibration processing on the surface profile measurements, a data processing code segment for performing data processing on the surface profile measurements, and a data output code segment for providing data output based upon the calibration processing and the data processing.

Implementations may include one or more of the following. For example, the calibration processing code segment may further include a surface displacement calibration processing code segment for performing surface displacement calibration processing on the surface profile measurements and an X-Y mapping calibration code segment for performing X-Y mapping calibration processing on the surface profile measurements. The data processing code segment may further include an image preprocessing code segment for performing image preprocessing, a blob analysis code segment for performing blob analysis, a coordinate mapping code segment for performing coordinate mapping, and a post processing code segment for performing post processing. The image preprocessing code segment may include instructions for preparing a region of interest mask and applying the region of interest mask to raw data obtained for one or more of the points on the surface. The blob analysis code segment may include instructions for identifying at least one blob, calculating a centroid for the identified blobs, and assigning an index number to the identified blobs. The post processing code segment may include instructions for eliminating spurious data and interpolating raw data to a regular grid. Also, the computer readable storage medium may further include a display code segment for displaying the data output in a visual display.

In yet another general aspect, a computer program is stored on a computer readable medium and includes instructions for obtaining a calibration image, the calibration image including one or more surface profile measurements at one or more discrete points on a surface, performing calibration processing on the surface profile measurements, performing data processing on the surface profile measurements, and providing data output based upon the calibration processing and the data processing.

Implementations may include one or more of the following. For example, the instructions for performing calibration processing may further include instructions for performing surface displacement calibration processing on the surface profile measurements and performing X-Y mapping calibration processing on the surface profile measurements. The instructions for performing data processing may further include instructions for performing image preprocessing, performing blob analysis, performing coordinate mapping, and performing post processing. The instructions for performing image preprocessing may include instructions for preparing a region of interest mask and applying the region of interest mask to raw data obtained for one or more of the points on the surface. The instructions for performing blob analysis may include instructions for identifying at least one blob, calculating a centroid for the identified blobs, and assigning an index number to the identified blobs. The instructions for performing post processing may include instructions for eliminating spurious data and interpolating raw data to a regular grid.

Other features will be apparent from the description, the drawings, and the claims.

BRIEF DESCRIPTION OF THE DRAWINGS

FIG. 7C is an exemplary diagram of results from the software of FIGS. 3 and 7A.

DETAILED DESCRIPTION

Surface profile measurement processing techniques as described herein are directed to the processing of raw images to produce a measurement output. In particular, the techniques are used with a Global Laser Rangefinder Profilometry (GLRP) system. GLRP provides a high-rate, three-dimensional mapping of surface waves over a large physical area, and is suitable for the study of large-amplitude transient wave dynamics in large-scale facilities. GLRP can be extended to full-scale trials for the use of profiling surface waves in the near field of ocean-going vessels. GLRP systems and techniques are described in co-pending U.S. application Ser. No. 10/932,648, filed Sep. 2, 2004, which is incorporated herein by reference.

Figure 1:
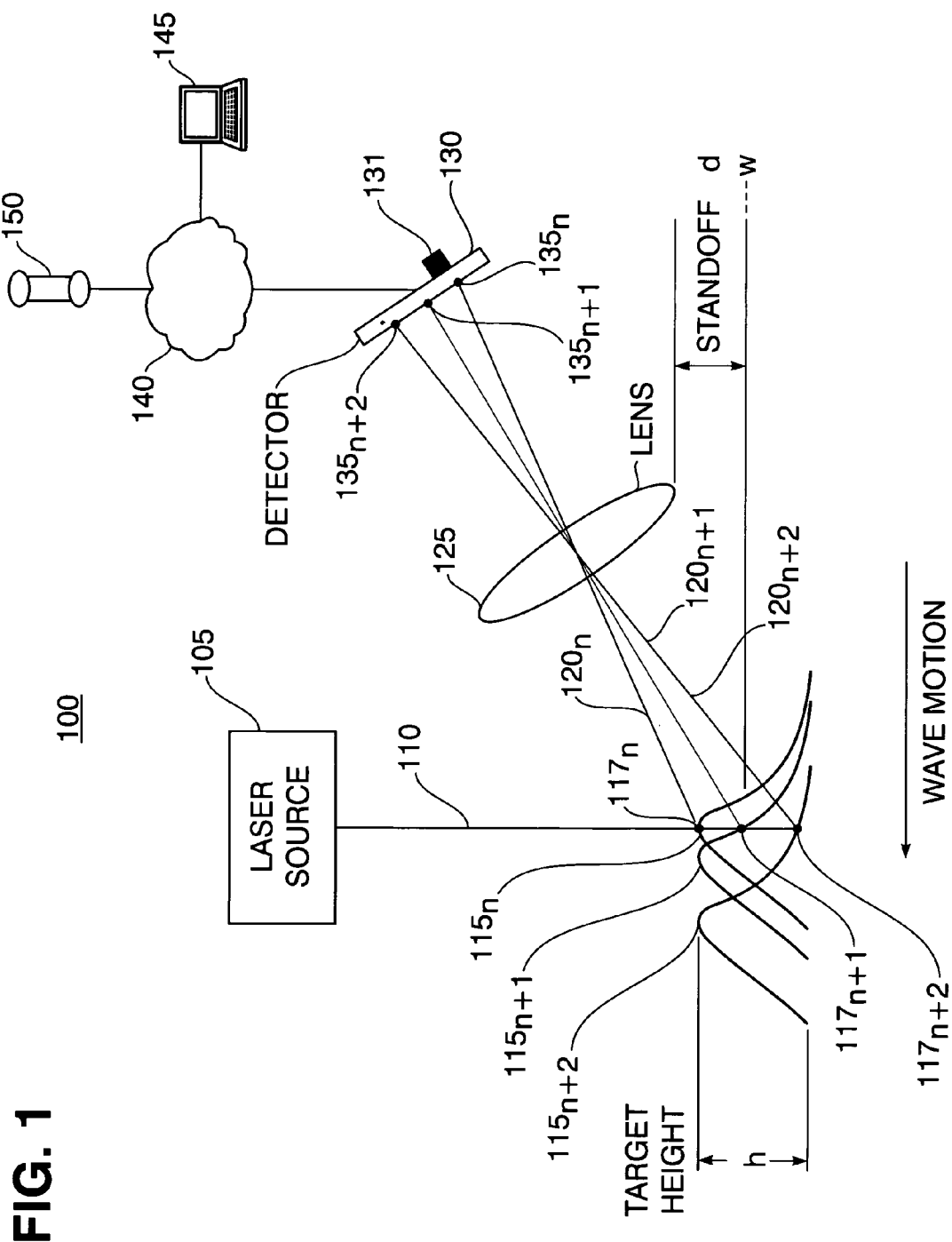
FIG. 1 is an exemplary system for surface profile measurement processing that uses Global Laser Rangefinder Profilometry (GLRP).

At the most fundamental level, Global Laser Rangefinder Profilometry (GLRP) operates based on triangulation in a manner similar to a conventional laser rangefinder. As shown in FIG. 1, an exemplary GLRP system 100 includes a laser source 105 that projects a beam 110 of visible laser light that creates a spot $117n$ on the target surface, which in FIG. 1 is a wave surface $115_n$. As shown, the target is a point on the wave surface 115, that is propagating in the direction of wave motion. The target is shown at three different times: (1) at time=n; (2) at time=n+1; and (3) at time=n+1. Spot $117_n$ is shown on wave surface $115_n$ at time n. Similarly, spot $117_{n+1}$ is shown on wave surface $115_n$ at time n+1 and spot $117_{n+2}$ is shown on wave surfaces $115_{n+2}$ at time n+2. For diffuse surfaces, scattered reflection beam $120_n$ (as well as reflection beams $120_{n+1}$ and $120_{n+2}$ at times n+1 and n+2 respectively) is viewed from an angle by a detector 130, such as a line-scan detector, through a collection lens 125. The apparent position of the spot image $130_n$ (as well as spot images $130_{n+1}$ and $130_{n+2}$ at times n+1 and n+2 respectively) on the pixel elements of the detector 130 changes with the viewing angle and the distance to the target $117_n$ (as well as targets $117_{n+1}$ and $117_{n+2}$ at times n+1 and n+2 respectively), and thus the distance to the target can be computed from the image pixel data. Usually, commercial laser rangefinders using triangulation are designed for measurements with short distances to the target surface, but measurement resolution can be very high, approaching 0.01% of full-scale span in some instances.

The detector 130 may include local data storage (131). The local data store 131 may be various known devices, such as a hard drive or memory, used to store data. The detector 130 may be connected to a communications link 140 and may communicate with a data store 150 and/or a processing device 145 such as a computer through the communications link 140. The communications link 140 may be various wired or wireless communications links. The data store 150 may be various known devices, such as a hard drive or memory, used to store data. The processing device 145 may be, for example, a computer or data processor such as a general purpose computer or a special purpose computer. The processing device 145 may include a user interface, such as a graphical user interface (GUI) to communicate with a user and also may include real time or offline processing software for processing data obtained from the detector 130 or data store 150.

GLRP extends the concept of a triangulating laser rangefinder from a single-spot measurement to a cost-effective, spatially-distributed measurement at a large number of points over a three-dimensional surface of interest. The technique utilizes multiple light sources, such as laser beams from inexpensive commercial-off-the-shelf laser diodes, for tagging discrete points on the surface and recording the apparent positions of the laser spots with a camera or other recording device, such as an area-scan CCD camera.

As described herein, the physical coordinates of the measurement points defining the target surface can then be determined through calibration. Using the GLRP measurement techniques, a typical camera such as a mega-pixel CCD camera operating at a video rate can record the positions of hundreds of laser spots simultaneously, allowing the dynamic profiling of a surface whose deformation changes rapidly in time. Only a single camera is necessary for measurement, greatly simplifying the experimental setup and reducing hardware and operating cost. Because GLRP is an optical non-intrusive measurement technique, it is also highly adaptable and scalable to various other scientific and industrial applications.

Figure 2A:
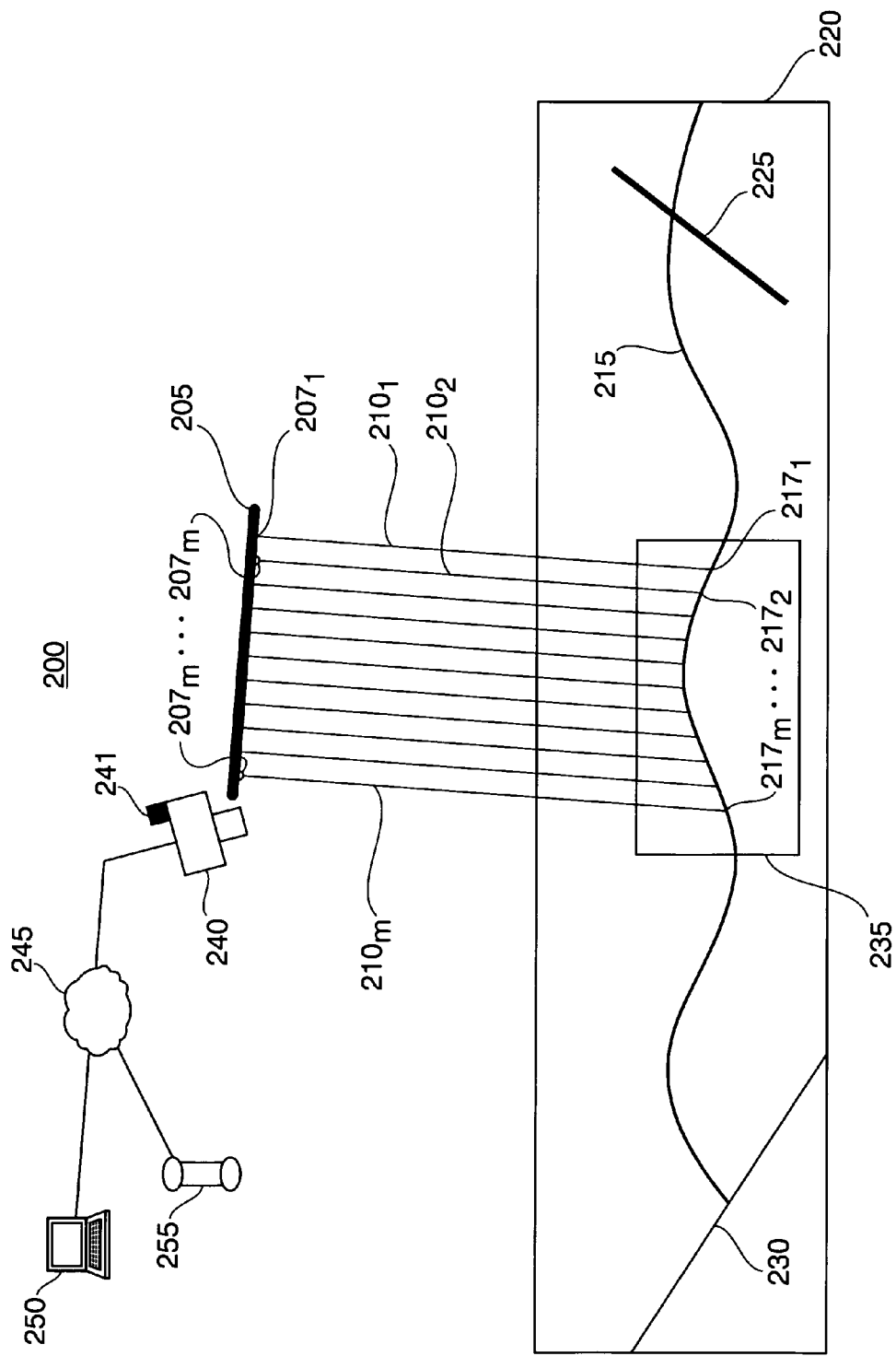
FIG. 2A is another exemplary system for surface profile measurement processing that uses Global Laser Rangefinder Profilometry (GLRP).
Figure 2B:
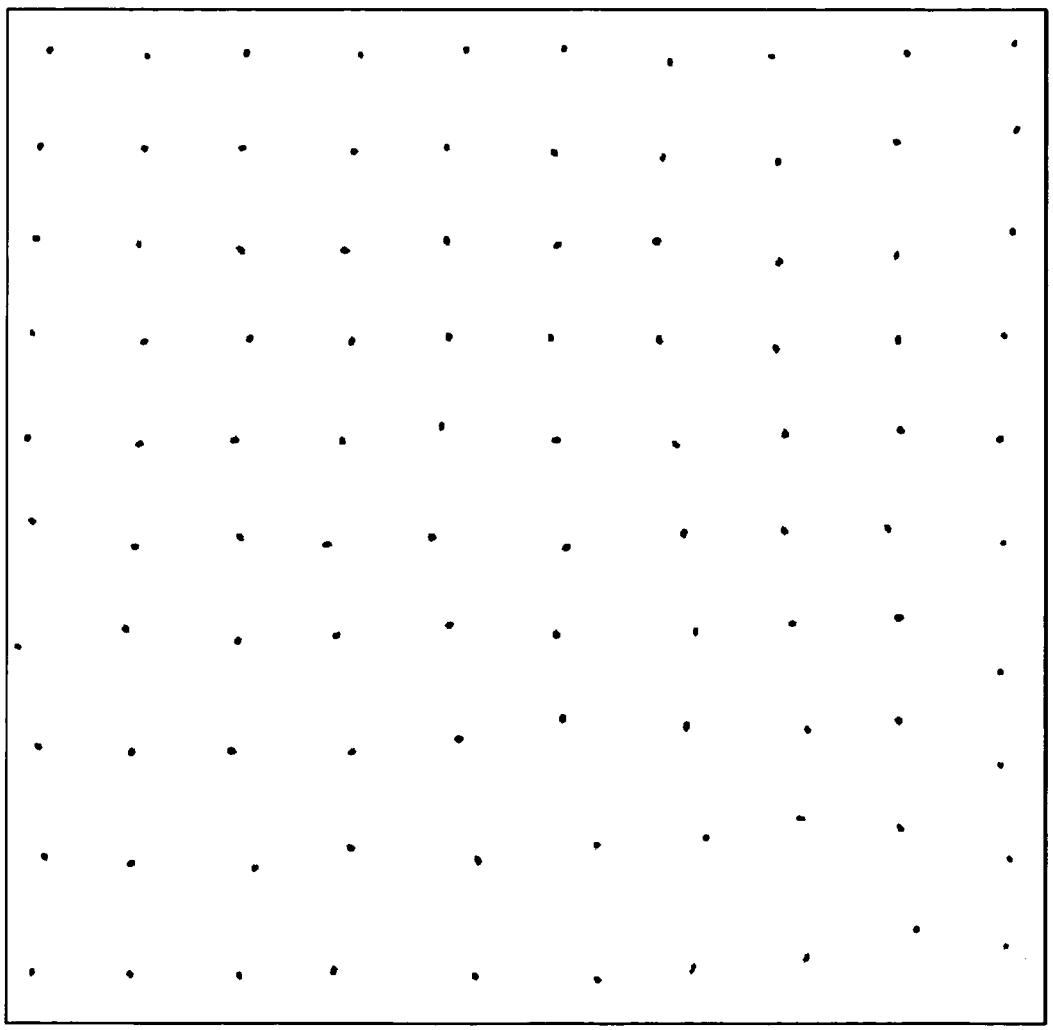
FIG. 2B is an exemplary diagram of raw data collected by the system of FIG. 2A.

FIG. 2A illustrates another exemplary GLRP system 200 that may be used to profile, among other things, two-dimensional wave surfaces. The GLRP system 200 includes an array of light sources 205, such as laser diodes, that is used to illuminate the surface 215 of interest and a detector 240, such as a progressive scan CCD camera, to record the images of the laser spots. FIG. 2B shows raw data obtained from the exemplary GLRP system 200.

In particular, as shown in FIG. 2A the array 205 includes m elements $207_1, 207_2, \ldots, 207_m$, where each element is a single light source such as a laser diode. The array 205 also may be a two dimensional array of m×n elements, where the dimension m may or may not be equal to the dimension n. Elements $207_1, 207_2, \ldots, 207_m$ project beams $210_1, 210_2, \ldots, 210_m$ of laser light on the surface 215 simultaneously or nearly simultaneously to illuminate points $217_1, 217_2, \ldots, 217_m$ on the surface 215. The surface 215 may be coated with a dye to aid in reflection of the beams $207_1, 207_2, \ldots, 207_m$ for detection by the detector 240. The detector 240 is positioned so that its field of view 235 encompasses the illuminated points $217_1, 217_2, \ldots, 217_m$.

The detector 240 may include a local data storage (241). The local data store 240 may be various known devices, such as a hard drive or memory, used to store data. The detector 240 may be connected to a communications link 245 and may communicate with a data store 255 and/or a processing device 250 such as a computer through the communications link 245. The communications link 245 may be various wired or wireless communications links. The data store 255 may be various known devices, such as a hard drive or memory, used to store data. The processing device 250 may be, for example, a computer or data processor such as a general purpose computer or a special purpose computer. The processing device 250 may include a user interface, such as a graphical user interface (GUI) to communicate with a user and also may include real time or offline processing software for processing data obtained from the detector 240 or data store 255.

In one implementation, the surface 215 may be water contained in a tank 220. The tank 220 may include one or more wavemakers 225, such as pneumatic wavemaker units, that can be operated in unison or individually, permitting regular wave generation and irregular wave generation simulating the ocean. The tank 220 also may include a beach 230 for wave damping.

In one implementation, the array 205 may be a 60 cm×60 cm diode panel constructed of a 12.5 mm thick sheet of PVC with 100 mounting holes formed perpendicular to the panel on a 50.8×50.8 mm grid. A light source, such as a laser diode, is installed into each mounting hole. In one implementation, the laser diode operates at 650 nm with a typical output of 3.5 mW. No special provisions for alignment of the laser diodes is required. The entire panel may then be rotated at an angle, such as 5 degrees, to the water surface 215 that is to be measured so that all 100 laser beams form approximately the same slant angle with respect to the water surface 215. The camera 240 may be a single CCD camera such as a Roper Scientific ES4.0 operating at 30 fps and with a 1024×1024 pixel resolution. The camera 240 is mounted next to the panel at a small angle so that the field of view 235 covers the images of all the laser spots over the full range of water elevations desired to be measured.

Many other GLRP system configurations are possible. For example, in another exemplary experimental setup, a platform houses four separate measurement panels where each measurement panel is mounted to a linear traversing system. Each panel is 0.76 m×1.52 m in size and holds 200 laser diodes (655 nm, 25 mW output), installed every 7.6 cm in a regular grid pattern. In this example, each panel may use two progressive-scan CCD cameras (e.g., Hitachi model #KP-F120CL) operating at 1392×1040 pixel resolution and a repetition rate of 30 fps, each recording the images of 100 laser spots. The cameras are hard-mounted to the laser diode panels so they can be lowered or raised as one unit for calibration purposes. The four measurement panels and eight cameras used together can profile the water surface at 800 discrete measurement points, with a repetition rate of 30 Hz over an area roughly 1.6 m×3.2 m in size. The images from the eight CCD cameras are acquired and stored onto two acquisition computer systems, each capable of recording images from four cameras simultaneously. Each computer system utilizes a high-capacity real-time disk system that allows continuous recording of the images from four cameras at the full frame rate.

A sprinkler system may be installed around the platform to allow a dye, such as Oxazine 725 dye solution, to be sprayed onto the surface of the water before each measurement run. Eventually the dye disperses over time, but continuous measurement over 1-2 minute period can be readily achieved. In some implementations, once the dye disperses the laser beams no longer make distinct spots on the surface, resulting in a degradation of the measurement. The length of a typical experimental run allows the continuous measurement of dynamic events.

In one implementation, an aqueous solution of Oxazine 725 chloride dye (10-4 molarity) is sprayed onto the surface of the water before each measurement. Oxazine 725 chloride has a strong absorption peak around a chosen laser wavelength and fluoresces brightly with laser illumination. For high enough concentrations, most of the laser energy either is reflected or absorbed at the surface, with little of the laser beam energy penetrating the surface. An interference filter with a peak transmission of 50% at 700 nm and a FWHM of 40 nm with a blocking OD of 4.0 is fitted on the camera lens to attenuate the reflected beam and ensure that only diffuse fluorescent light from the water surface is recorded. In such a manner, the apparent positions of the laser spots recorded by the camera correspond to the physical intersection of the laser beams with the water surface.

GLRP Software

Figure 3:
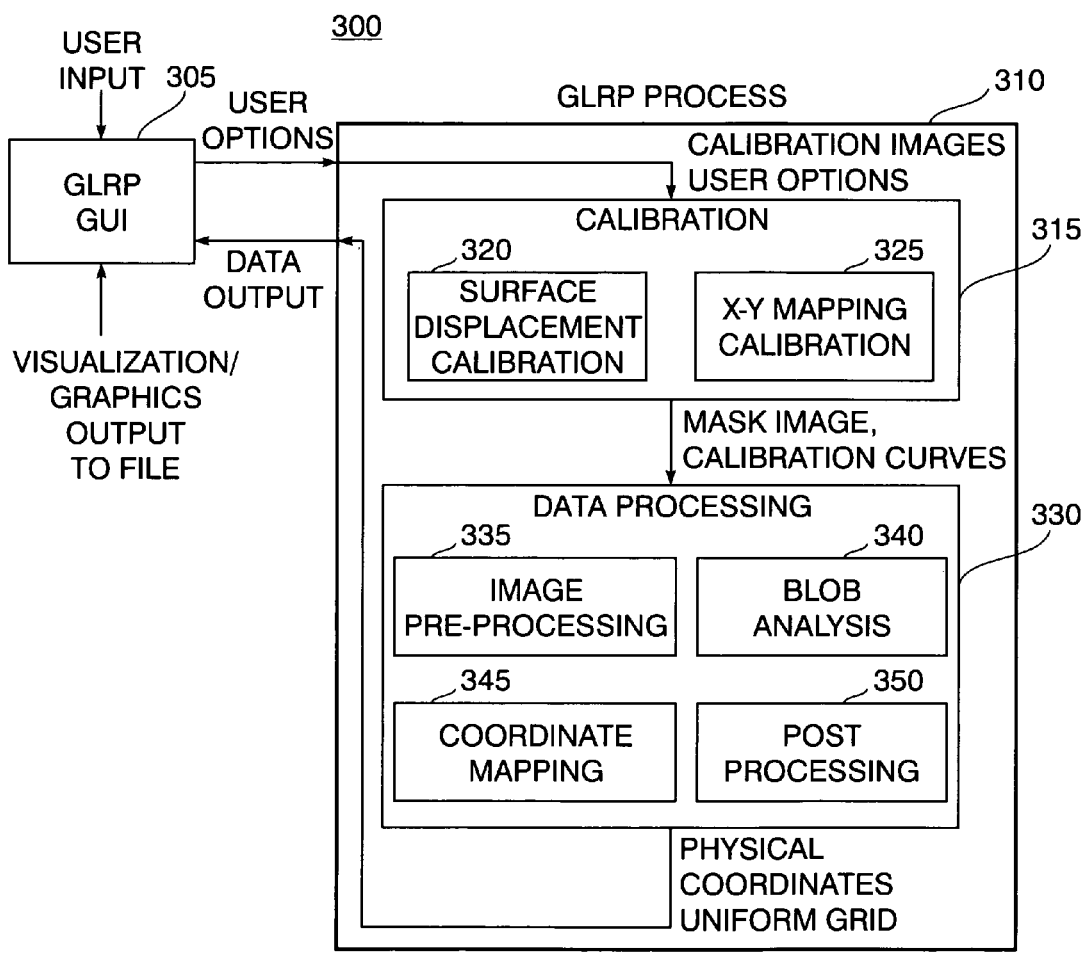
FIG. 3 is an exemplary software module block diagram of profile processing software for use in the systems of FIGS. 1 and 2A.

An exemplary software module flow-chart of software for processing surface profile measurement data is shown in FIG. 3. The software 300 includes a GLRP graphical user interface (GUI) module 305 and a GLRP process module 310. The GLRP process module 310 includes a calibration module 315 and a data processing module 330, which may be controlled by GUI module 305. The GUI module 305 provides dynamic control of the GLRP process module 310, allowing the user to load and save user settings, perform multiple calibrations, and specify the variables used in the performance of calibration and data processing. In addition, the GUI module 305 gives the user the ability to specify several output types including AVI movies and text data files. From the user perspective, the GUI serves as a main program, while the calibration and data processing modules act as functions within the main program.

Calibration Module

FIGS. 3, 4A, 4B, 4C, 4D, 4E, 5A, 5B, 5C, and 5D illustrate various aspects of the calibration module 315. The calibration algorithm is crucial to the accurate determination of a surface wave profile. The calibration module 315 includes both a surface displacement calibration module 320 and an X-Y mapping calibration module 325. The calibration module 315 takes user inputs as arguments and provides an ROI mask image, a diode-index mask image, and calibration curves for each of the physical laser diodes as outputs to the other modules in the software package.

It is possible to write the relationship between the shift in the pixel locations of the laser spots in the image plane and the changes in surface elevation at each of the measurement locations in analytical form. In practice, however, such an attempt to measure surface elevation is prone to significant error because it requires precise knowledge of the optical transfer function of the imaging system and the origin and angle of each laser beam. Instead, a calibration procedure is used that allows the relationship between the local surface elevation and the apparent position of each laser spot to be determined in an empirical manner. Two separate static calibrations, a surface displacement calibration and an X-Y mapping calibration, are required in order to accurately determine the physical coordinates $(x_p, y_p, z_p)$ of the laser spots from the apparent or pixel coordinates $(x_a, y_a)$ in the image pixel data. The surface displacement calibration yields the relationship between $z_p$ and $(x_a, y_a)$, and the X-Y mapping calibration yields the relationship between $(x_p, y_p)$ and $(x_a, y_a)$. The surface displacement calibration module 320 performs surface displacement calibration and the X-Y mapping calibration module 325 performs X-Y mapping calibration.

The surface displacement calibration procedure involves recording an image of the laser spots in calm water at different surface elevations in the experimental facility. For a small-scale facility, changing the water level can be easily accomplished by adding or removing water until the water surface reaches the desired elevation. For a large-scale facility in which changing the water level is impractical due to the large volume of water, the laser diode panel and the camera can be mounted together and lowered or raised as one unit to simulate the incremental change in surface elevation. FIGS. 4A, 4B, 4C, 4D, and 4E illustrate various aspects of the surface displacement calibration module 320. For example, the surface displacement calibration images at five different surface elevations are shown superposed in FIGS. 4B, 4C, and 4D.

Figure 4A:
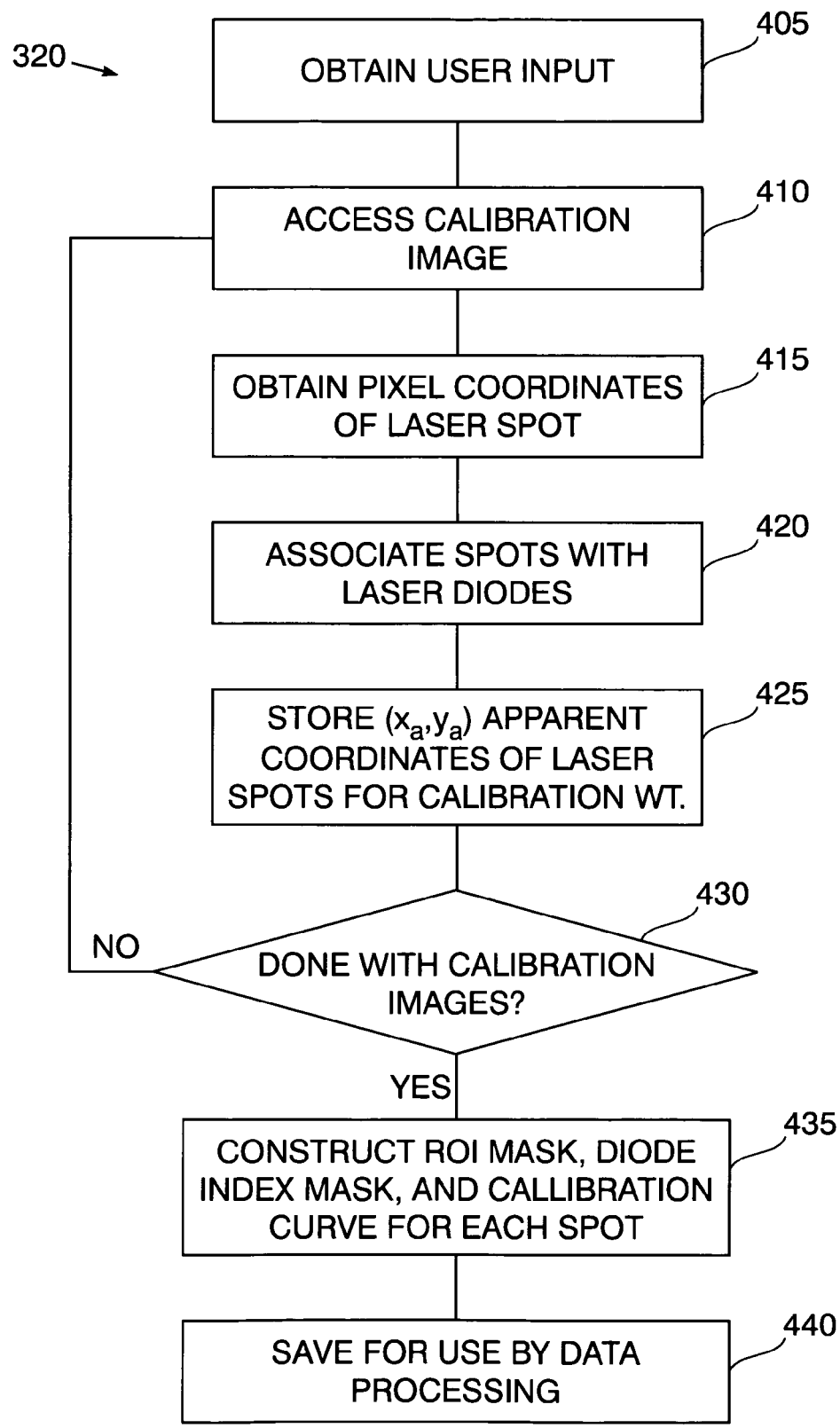
FIG. 4A is an exemplary flow diagram for the surface displacement calibration software module of FIG. 3.
Figure 4B:
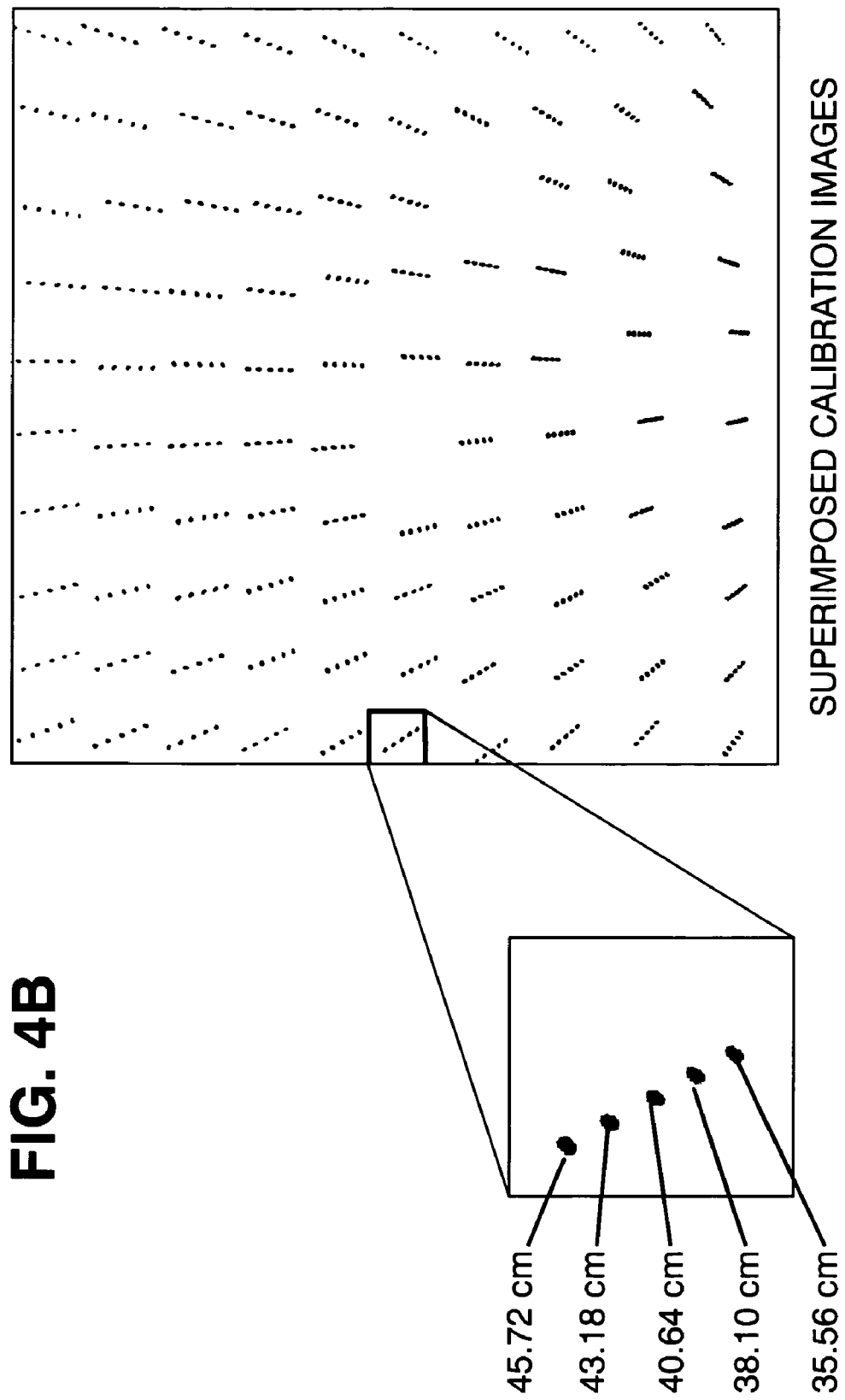
FIG. 4B is an exemplary diagram of superimposed calibration images generated by the system of FIG. 2A for use in the software of FIGS. 3 and 4A.
Figure 4C:
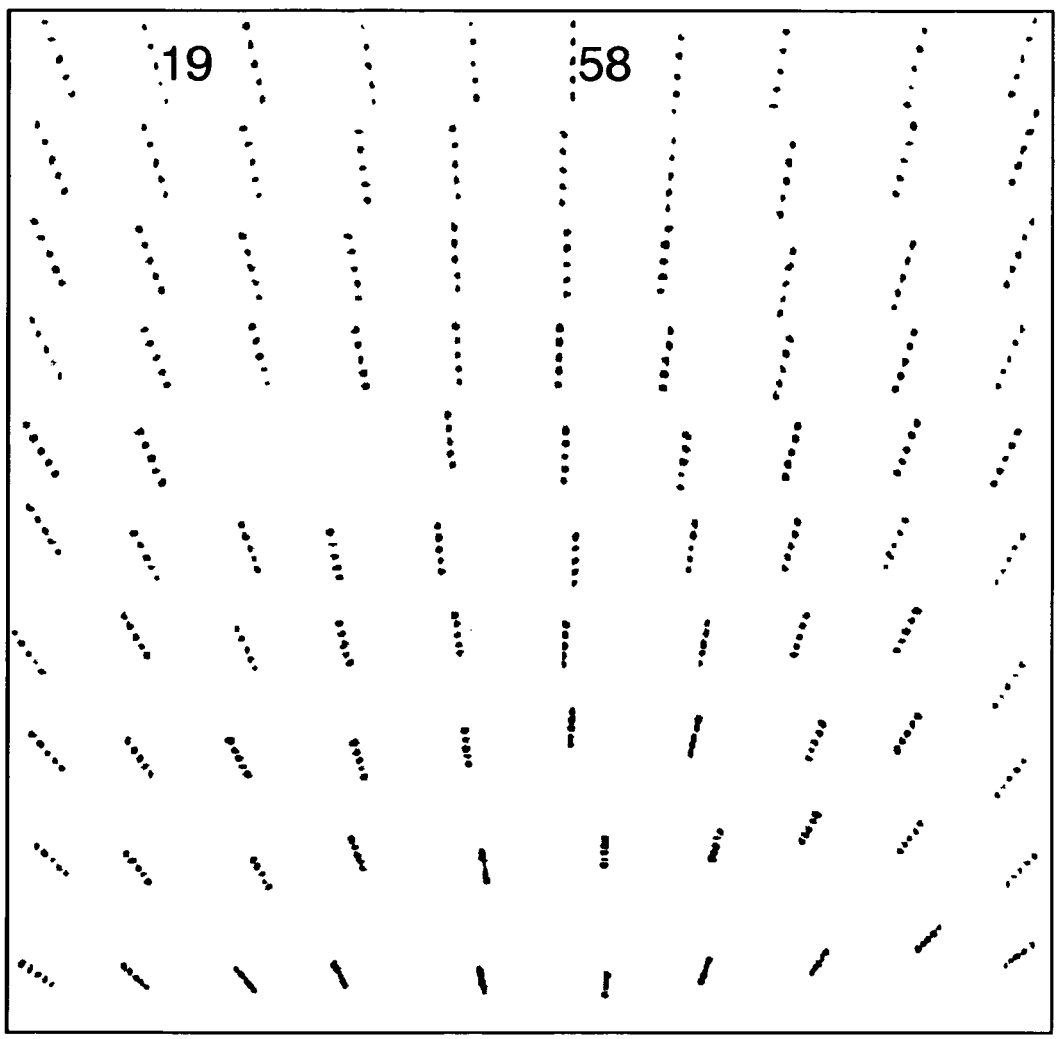
FIG. 4C is an exemplary diagram of superimposed calibration images labeled for exemplary diodes 19 and 58 of the system of FIG. 2A for use in the software of FIGS. 3 and 4A.
Figure 4D:
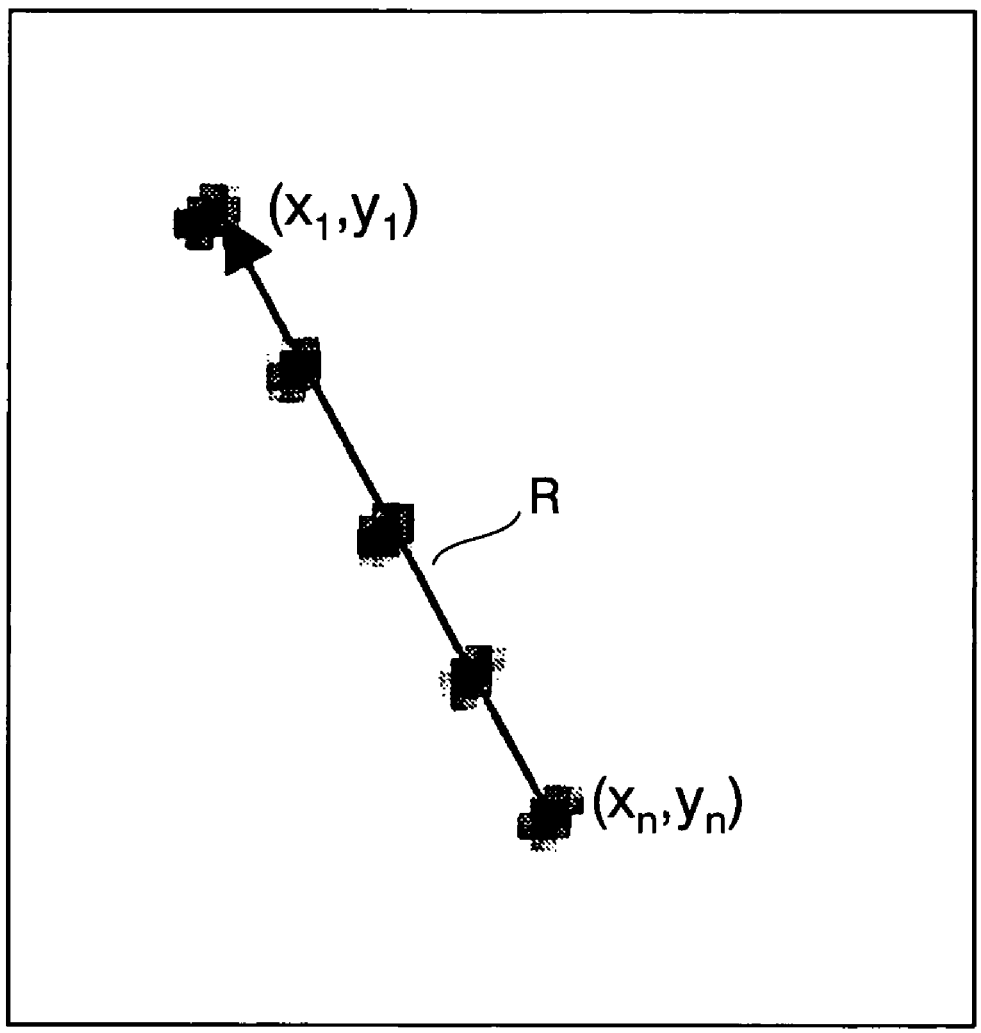
FIG. 4D is an exemplary diagram of the identification of spot groups in the superimposed calibration images of FIGS. 4B and 4C.
Figure 4E:
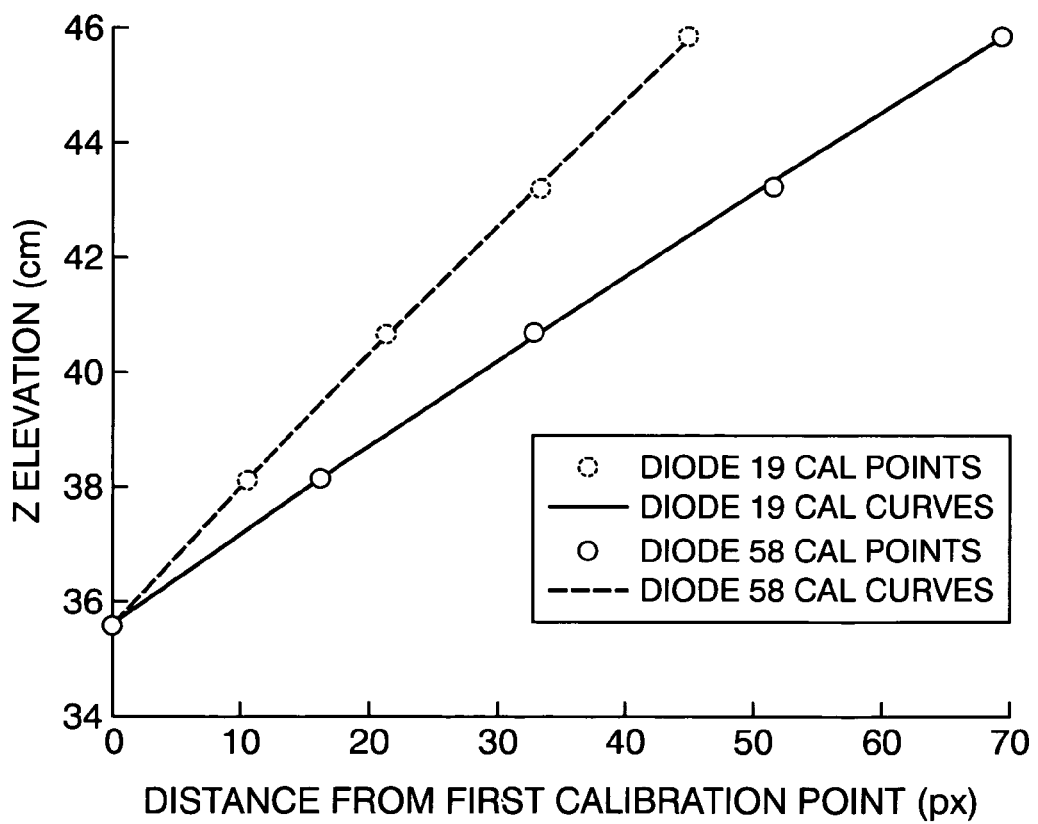
FIG. 4E illustrates exemplary calibration curves for exemplary diodes 19 and 58 of the system of FIG. 2A for use in the software of FIGS. 3 and 4A.

FIG. 4B shows a superposition of five images of the laser spots, taken in calm water at elevations of 35.56 cm, 38.10 cm, and 40.64 cm, 43.18 cm, and 45.72 cm. The apparent positions or pixel locations of the laser spots on the CCD array change with the water elevation. A change in the water elevation causes a real spatial displacement in the intersection points of the laser beams to the water surface, both vertically and laterally due to the beam angle. When viewed from the top, the physical displacement of the laser spots in the lateral direction causes a corresponding shift in the spot images on the CCD array. Also, the physical displacement in the vertical direction causes a local change in the magnification ratio of the imaged spots, resulting in an apparent shift of the spots when viewed off-axis from the camera optical axis. The relative contribution of these two effects to the positional shift of the laser spots in the image plane depends primarily upon the ratio of the peak-to-peak wave elevation under investigation and the distance from the camera to the surface (standoff distance). For example, if the camera is sufficiently far away, there would be little change in the local magnification of the laser spots as the water elevation changes, and the shift in the pixel locations of the laser spots would be due primarily to the beam angle. By determining the pixel location of each laser spot from images recorded during an experiment, the surface elevation at each of the measurement points can be determined as a function of time through calibration.

Once the set of calibration images is obtained, surface displacement calibration curves (FIG. 4E) for the laser diodes are constructed from the pixel coordinates of the laser spots at each surface elevation by the surface displacement calibration module 320.

In addition to the surface displacement calibration which yields the calibration curves for the vertical coordinate $z_p$ of the measured surface, it is also necessary to obtain the calibration curves for the lateral coordinates ($x_p$, $y_p$) by X-Y mapping calibration. The X-Y mapping calibration part of the static calibration procedure involves recording an image of a calibration target placed at several standoff distances from the imaging system. The front face of the calibration target contains markers, such as, for example, crosses or dots painted onto the target in a regular grid pattern. FIG. 5C illustrates an image, viewed from a slant angle, of a 60-cm square calibration target with cross markers in a 50.8-mm×50.8-mm regular grid pattern. Usually, it is practical but not necessary, to place the front face of the target in the same planes as the different surface elevations chosen in the surface displacement calibration. Again, either the target itself can be lowered and raised or the laser diode panel and the camera can be mounted together and lowered or raised as one unit to simulate the incremental change in the standoff distance. Once the set of X-Y mapping calibration images is obtained, X-Y mapping calibration curves for the laser diodes are constructed from the pixel coordinates of the markers at each surface elevation.

FIGS. 5A, 5B, 5C, and 5D illustrate various aspects of the X-Y mapping calibration module 325.

Surface Displacement Calibration Module

FIG. 4A shows an exemplary flow chart for the surface displacement calibration module 320. As shown, the surface displacement calibration module 320 obtains user input (step 405). The user input may include, for example and among other things, the number of calibration images N, the surface elevation corresponding to each calibration image, a search radius for corresponding diode locations in successive images, and an allowed path deviation radius. Each of the N calibration images are accessed (step 410). For each calibration image, pixel coordinates of the laser spot are obtained (step 415). Typically, each calibration image is processed with a blob analysis algorithm (340, as shown in FIG. 3) to determine the pixel coordinates of the laser spots, using an intensity-weighted centroid estimation algorithm. The laser spots are associated with laser diodes (step 420). In order to associate the laser spots to specific laser diodes, the initial calibration image taken at a neutral water elevation is processed first to obtain the centroid pixel location for each laser spot in the image. Each detected laser spot image is then assigned a unique diode-index number. As subsequent images are processed (step 430), detected laser spots are labeled according to a nearest neighbor search from the list of centroids detected in the previous image. The radius of the nearest neighbor search is controlled by the user-defined search radius. The apparent coordinates ($x_a$, $y_a$) of the laser spots for each calibration image are stored (step 425). This process is repeated in order to build an ($x_a$, $y_a$) coordinate history at every calibration height for each laser diode. Finally, this coordinate history is used to construct the ROI mask image, the diode-index mask image, and calibration curves for each laser spot (step 435). The results are saved for use by the data processing module 330 (step 440).

Each physical laser diode is now associated with an ($x_a$, $y_a$) coordinate history, comprising N pixel coordinates of its image centroids at successive water elevations. A new independent variable R is then calculated from the ($x_a$, $y_a$) coordinate history:

$$R=[(x_a-x_o)^2+(y_a-y_o)^2]^{1/2}, \quad (1)$$

where $x_o$ and $y_o$ are the coordinates of the image centroid at the neutral water elevation. Using user-defined calibration heights for each calibration image as the dependent variable $z_p$, a surface displacement calibration curve can now be plotted for each of the laser spots using a second-order polynomial least-squares fit:

$$z_p=a_0+a_1R+a_2R^2 \quad (2)$$

The $z_p$ calibration curves for all physical laser diodes are then saved for use by the data processing module. Some examples of surface displacement calibration curves are presented in FIG. 4E. The two curves shown correspond to the two groups of laser spots in FIG. 4C marked with indices 19 and 58.

X-Y Mapping Calibration Module

Figure 5A:
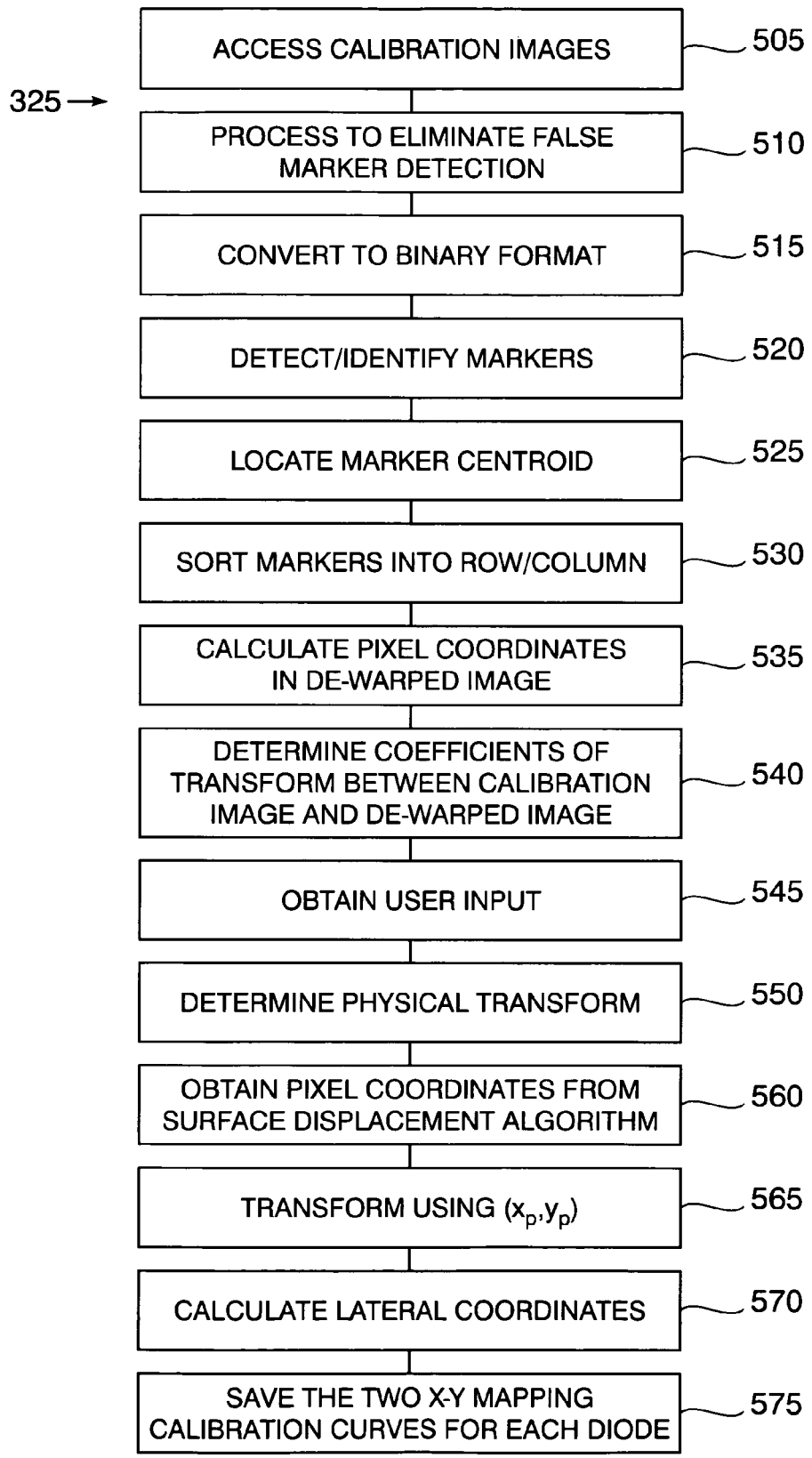
FIG. 5A is an exemplary flow diagram for the X-Y mapping calibration software module of FIG. 3.
Figure 5B:
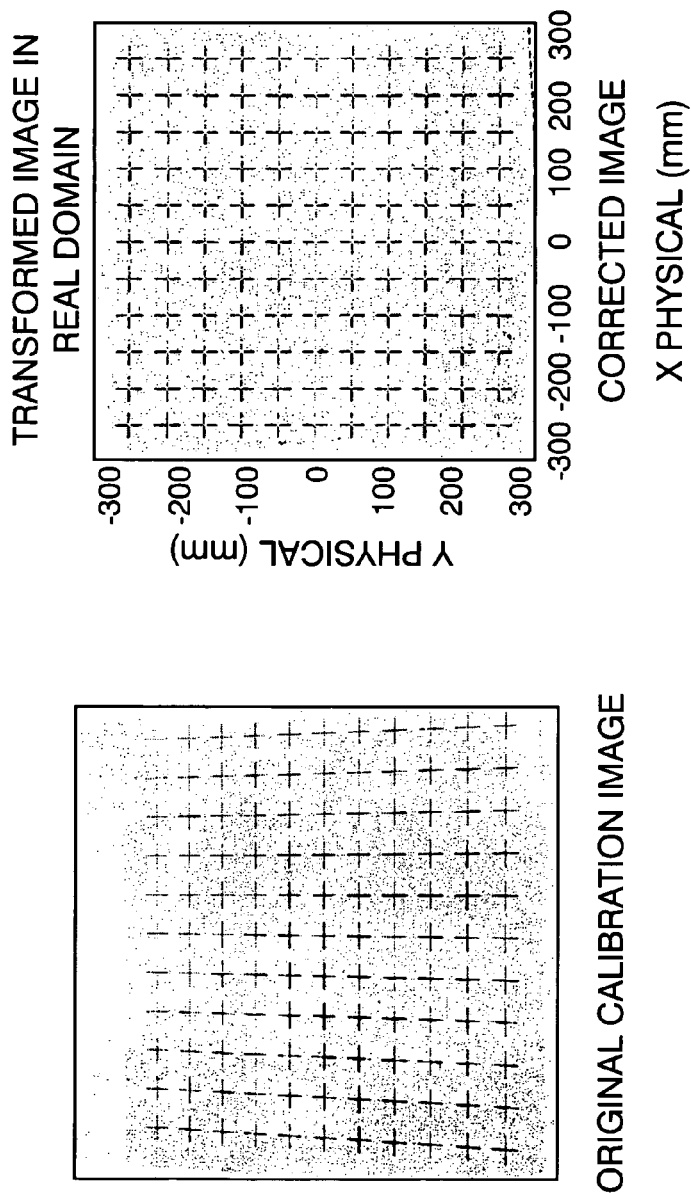
FIG. 5B is an exemplary diagram showing an original calibration image generated by the system of FIG. 2A and a corrected image that was corrected by the software of FIGS. 3 and 5A.
Figure 5C:
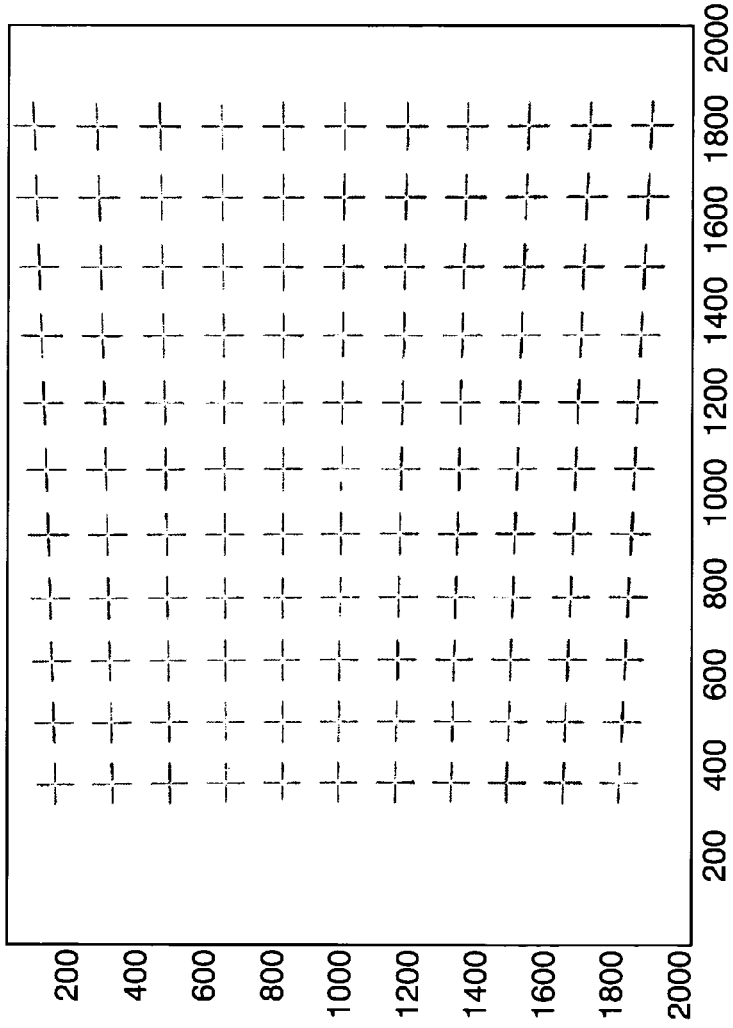
FIG. 5C is an exemplary image of a calibration target for use in the software of FIGS. 3 and 5A.
Figure 5D:
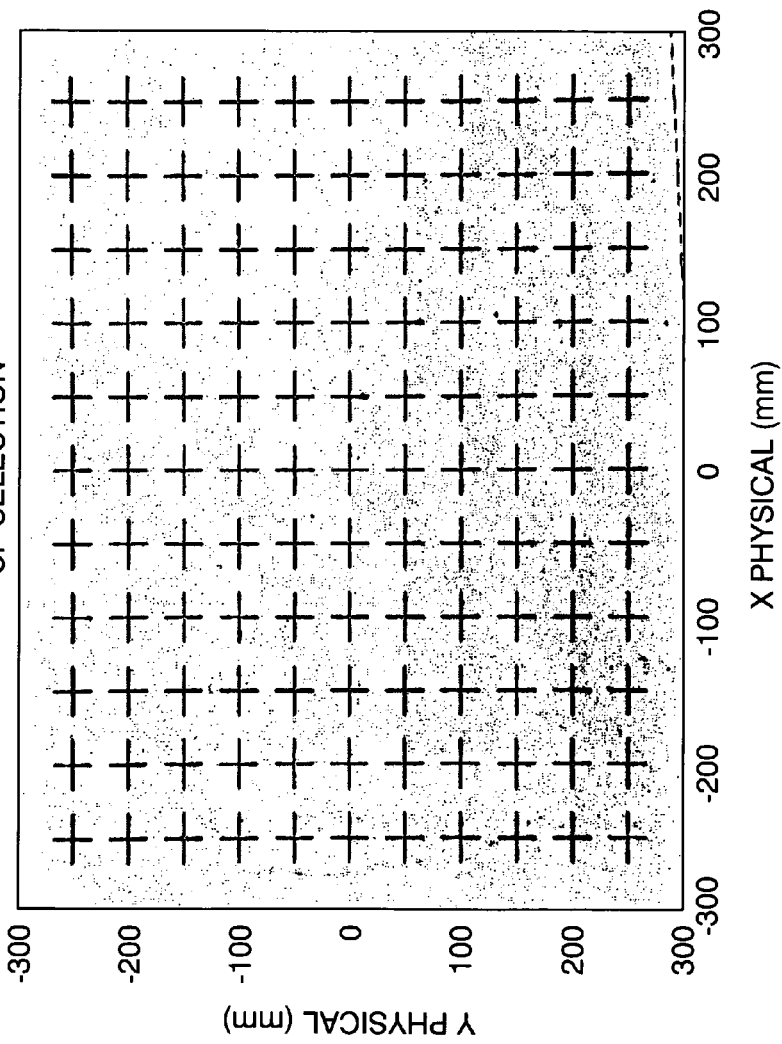
FIG. 5D is an exemplary image of a calibration target after processing by the software of FIGS. 3 and 5A.

FIG. 5A shows an exemplary flow chart for the X-Y mapping calibration module 325. The X-Y mapping calibration module 325 provides the calibration curves used for calculating the physical coordinates ($x_p$, $y_p$) from the apparent coordinates ($x_a$, $y_a$) in the image plane. For each calibration image, a geometrical transform that would "dewarp" the marker locations in the original calibration image into a regular grid pattern is performed (see FIGS. 5B, 5C, 5D), yielding a set of coefficients that describes the mapping function between the image and physical coordinate systems. First, a calibration image is accessed (step 505). The calibration image is processed to eliminate false maker detections (step 510). In one implementation, the calibration image is processed using an adaptive histogram equalization, a boundary subtraction, and a nonuniform background illumination correction to eliminate the false marker detections. The images are then converted to binary format (step 515) using, for example, a histogram threshold. The markers are detected and identified (step 520) using, for example, a 4-connected search algorithm. The marker centroid is located (step 525) using, for example, an unweighted centroid estimation technique. The estimated centroid locations of the markers may then be used as starting points in a refined step to locate the centroid for each marker by performing cross-correlation of the local image intensity with a template image of a synthetic marker with Gaussian intensity distribution.

In order to dewarp the image into a uniform grid, the detected markers are sorted into rows and columns (step 530). Each marker is assumed to be on a regular grid in the dewarped image, and pixel coordinates in the dewarped image for each marker are calculated (step 535). The refined centroid and dewarped coordinates of each marker are used to determine the coefficients (step 540) of a projective transform between the calibration image plane and the dewarped image plane. User input optionally is obtained (step 545). For example, the user may be prompted to select the center marker in the original image to provide a reference location in the transformed space. Given user-defined physical coordinates of the reference marker and physical spacing between the markers, the physical transform is determined (step 550) using the known reference position and the pixel coordinates of each marker in the dewarped image.

Next, the pixel coordinates of the laser spot centroids are obtained from the surface displacement calibration algorithm (step 560) and are transformed (step 565) using the appropriate set of mapping coefficients into x-y physical coordinates ($x_p$, $y_p$). Using the coordinates $x_p$ and $y_p$ now as the dependent variables, the lateral coordinates of the water surface at each measurement point are calculated (step 570) and can be expressed, using a second-order polynomial least-squares fit, as functions of the independent variable R:

$$x_p = b_0 + b_1 R + b_2 R^2 \quad (3)$$

and $$y_p = c_0 + c_1 R + c_2 R^2. \quad (4)$$

The two X-Y mapping calibration curves for each diode are then saved (step 575) for use by the data processing module.

Data Processing Module

The data processing module 330 takes user inputs and calibration information and outputs the profile of the wave surface. FIGS. 6A, 6B, 6C, 7A, 7B, 7C, 7D, 8, 9A, 9B, 9C, 10A, and 10B illustrate various aspects of the surface data processing module 330. Once the calibration curves have been obtained from the calibration module 315, the test data, comprised of a sequence of images obtained during an experimental run, are ready to be processed by the data processing module 330. The data processing module 330 includes an image preprocessing module 335, a blob analysis module 340, a coordinate mapping module 345, and a postprocessing module 350.

In the image preprocessing module 335, each image is multiplied by a region-of-interest (ROI) mask that is created using the surface displacement calibration images (see step 435 of FIG. 4A and FIGS. 6A, 6B, 6C). This ensures that noise outside the expected path of the laser spots is cancelled out before blob analysis is performed. The blob analysis module 340 performs blob analysis to identify the discrete laser spots and determine their centroids (see FIGS. 7A, 7B, 7C, 7D). The identified laser spots are then assigned an index number, which provides each laser spot an association to a physical laser diode. In the coordinate mapping module 345, the calibration curves are applied to the centroid pixel coordinates for each laser spot to determine the physical coordinates ($x_p$, $y_p$, $z_p$) of the wave surface (see FIG. 8). In the postprocessing module 350, a set of criteria is applied to each of the identified laser spots to discard outliers (see FIGS. 9A, 9B, 9C, 10A, 10B).

Image Pre-Processing Module

Figure 6A:
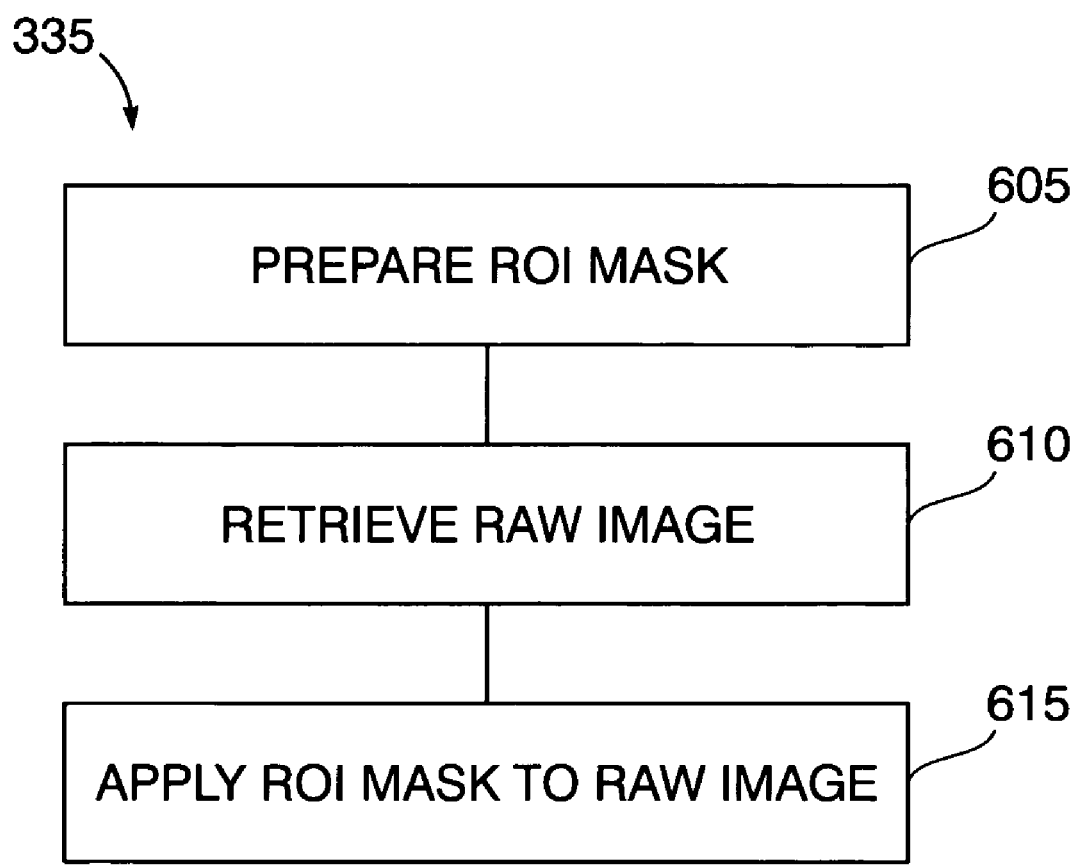
FIG. 6A is an exemplary flow diagram for the image preprocessing software module of FIG. 3.
Figure 6B:
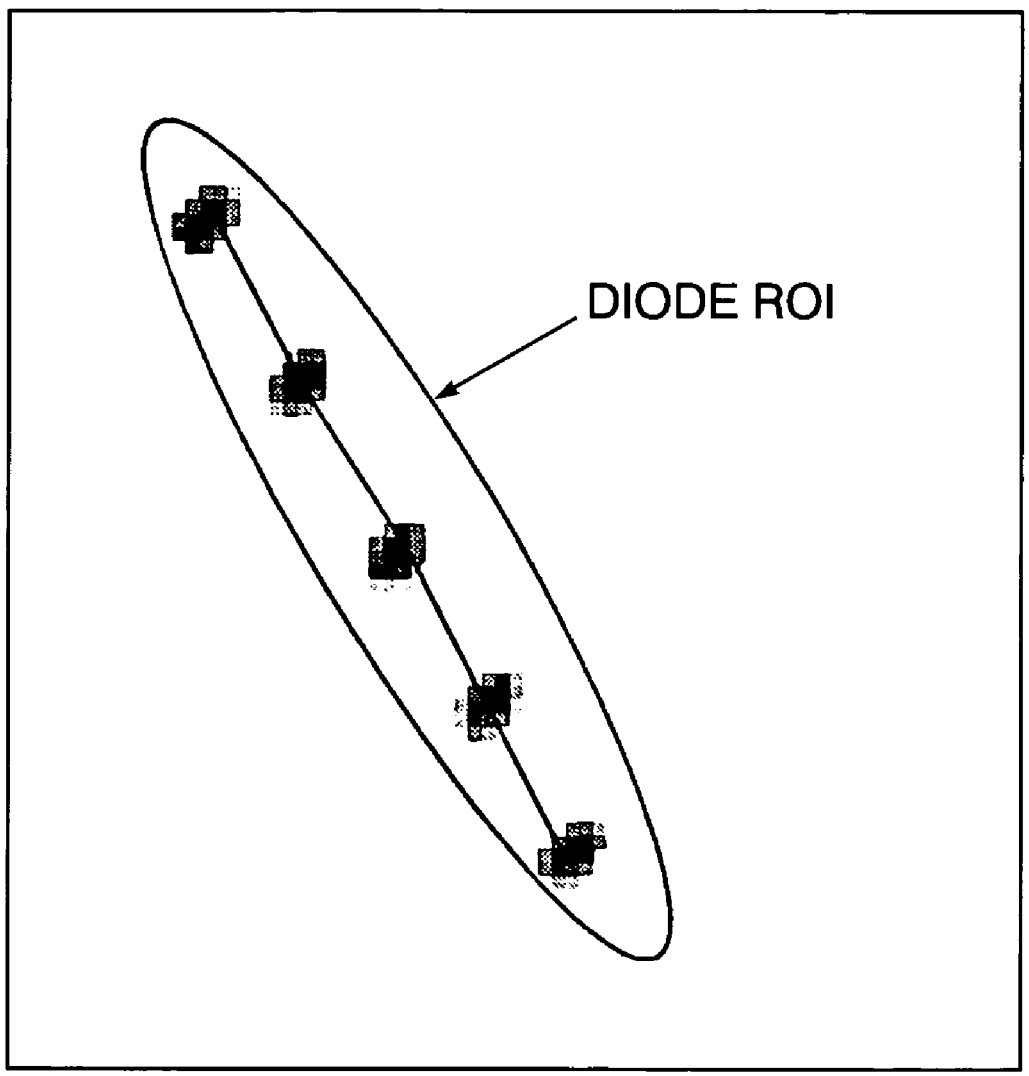
FIG. 6B is an exemplary diagram for determining a region of interest for the software of FIGS. 3 and 6A.
Figure 6C:
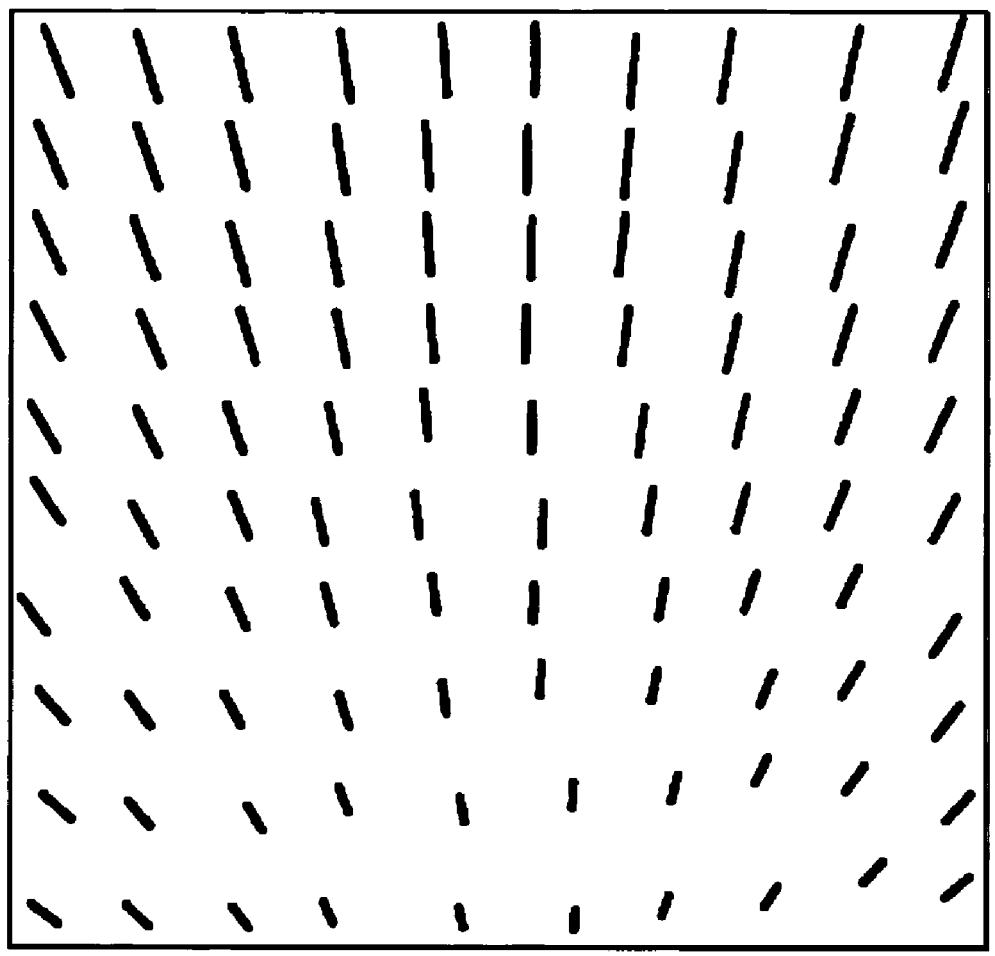
FIG. 6C is an exemplary region of interest mask for use in the software of FIGS. 3 and 6A.

FIGS. 6A, 6B, and 6C illustrate various aspects of the image preprocessing module 335. FIG. 6A shows an exemplary flow chart for the image preprocessing module 335. As described above, an ROI mask is prepared (step 605). In order to create an ROI mask image, a line is drawn between each successive (xa, ya) coordinate pair assigned to a particular diode in the coordinate history from the surface displacement calibration (see FIG. 6B). Any pixel within the user-defined allowed path deviation radius of the resulting lines is assigned a value of 1, while all other pixels in the ROI mask image are set to a value of 0. This process is repeated for each identified diode. A sample ROI mask image is shown in FIG. 6C. The constructed image contains a region of interest (ROI) for each diode in which detected laser spots are considered as valid.

Next, a raw image is retrieved (step 610) and the ROI mask is applied to the raw image (step 615). The ROI masking process eliminates the detection of particles outside of the diode regions of interest, and reduces false detection of other phenomena such as specular reflection and noise.

In one implementation, the image processing module 335 performs a 95% histogram threshold of the raw data in order to remove noise from the images and eliminate false detections. The 95% threshold searches for the intensity value below which 95% of the pixels in the data image possess an intensity value. The image is then thresholded at this intensity such that a pixel with an intensity value below the threshold value is set to zero and a pixel with intensity greater than the threshold is set to 1.

Blob Analysis Module

After the images are pre-processed by preprocessing module 335, blob analysis is performed on the resulting images by the blob analysis module 340. FIGS. 7A, 7B, 7C and 7D illustrate various aspects of the blob analysis module 340.

Figure 7A:
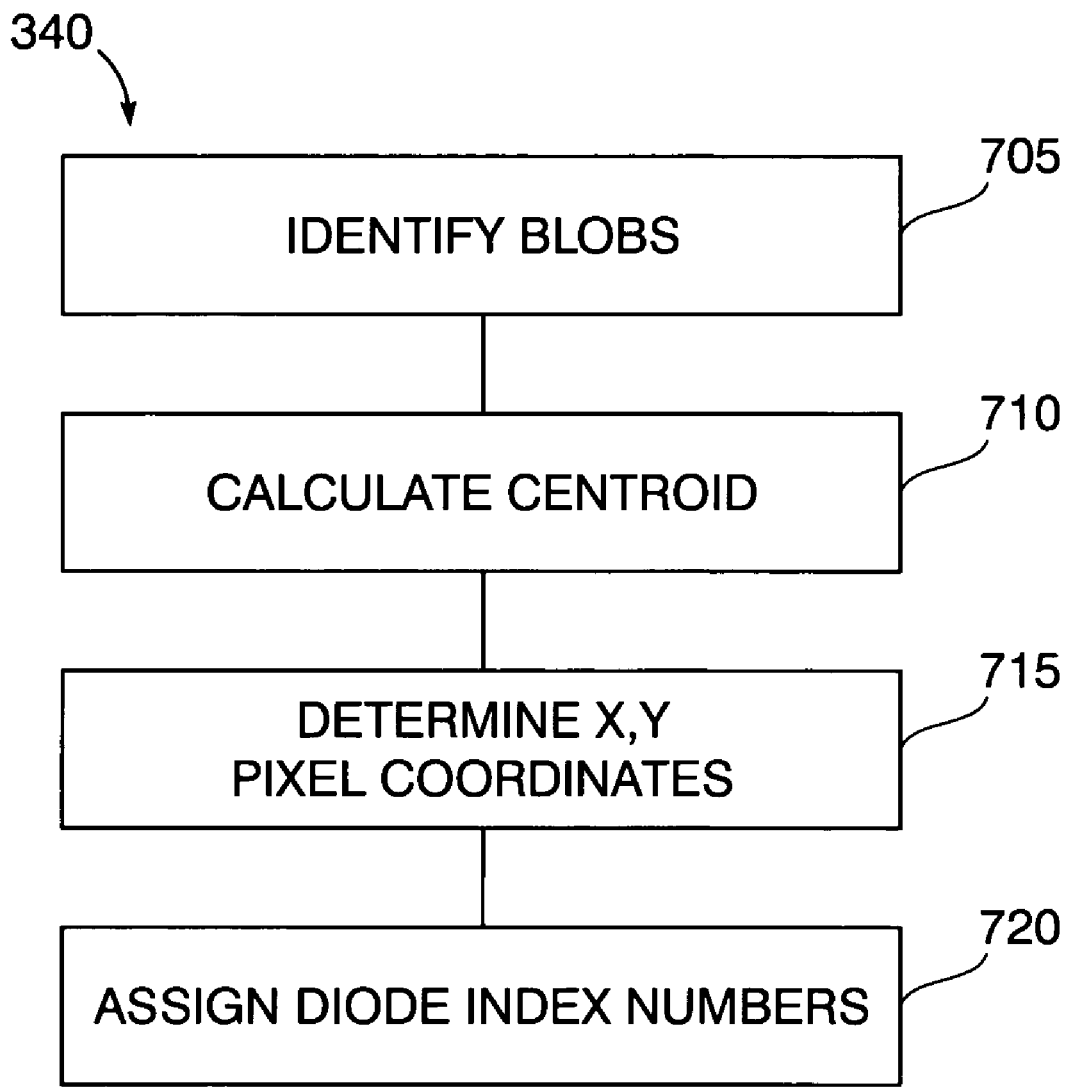
FIG. 7A is an exemplary flow diagram for the blob analysis software module of FIG. 3.
Figure 7B:
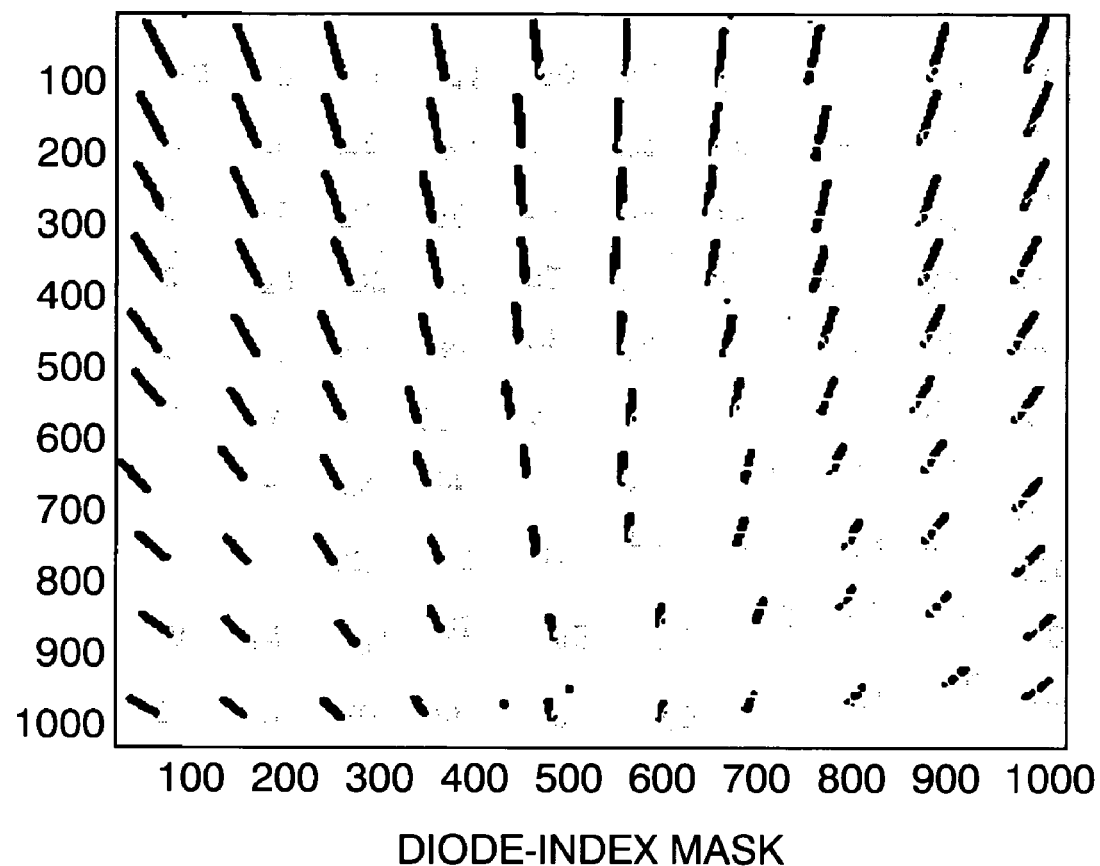
FIG. 7B is an exemplary diode index mask for use in the software of FIGS. 3 and 7A.
Figure 7C:
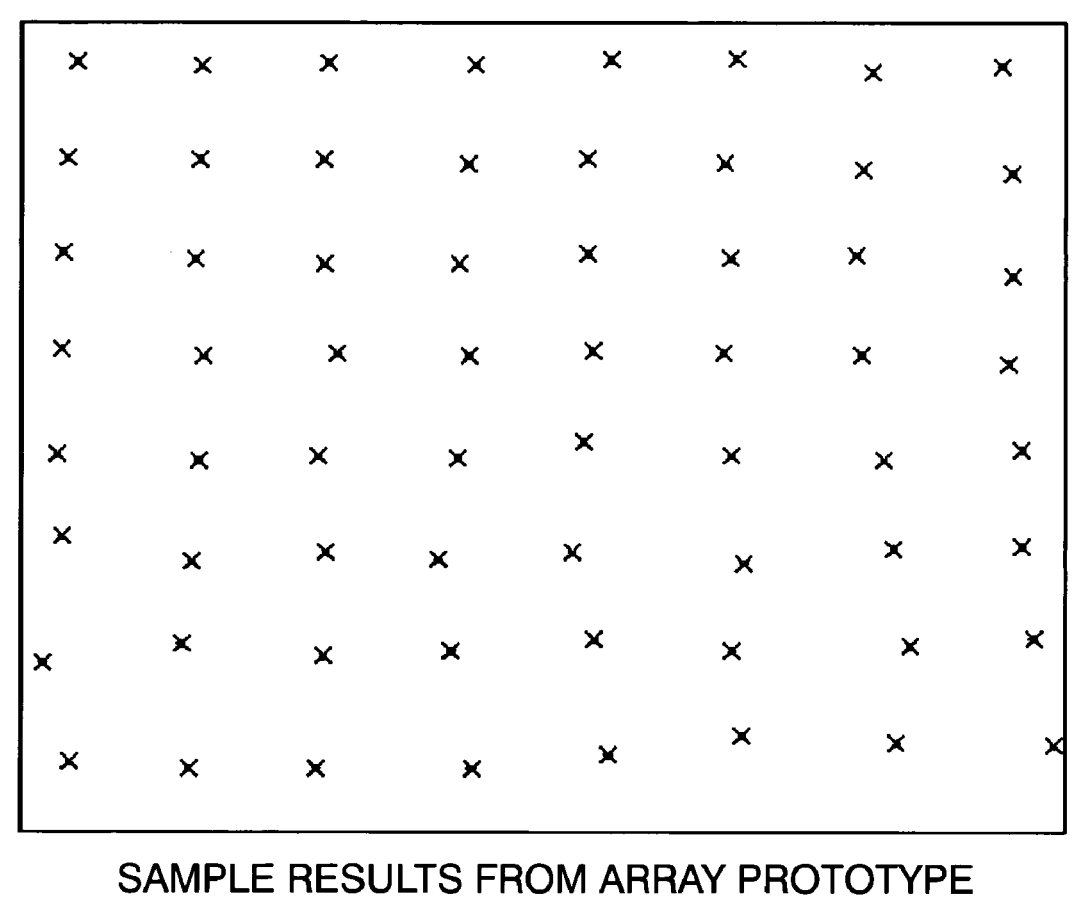
Figure 7D:
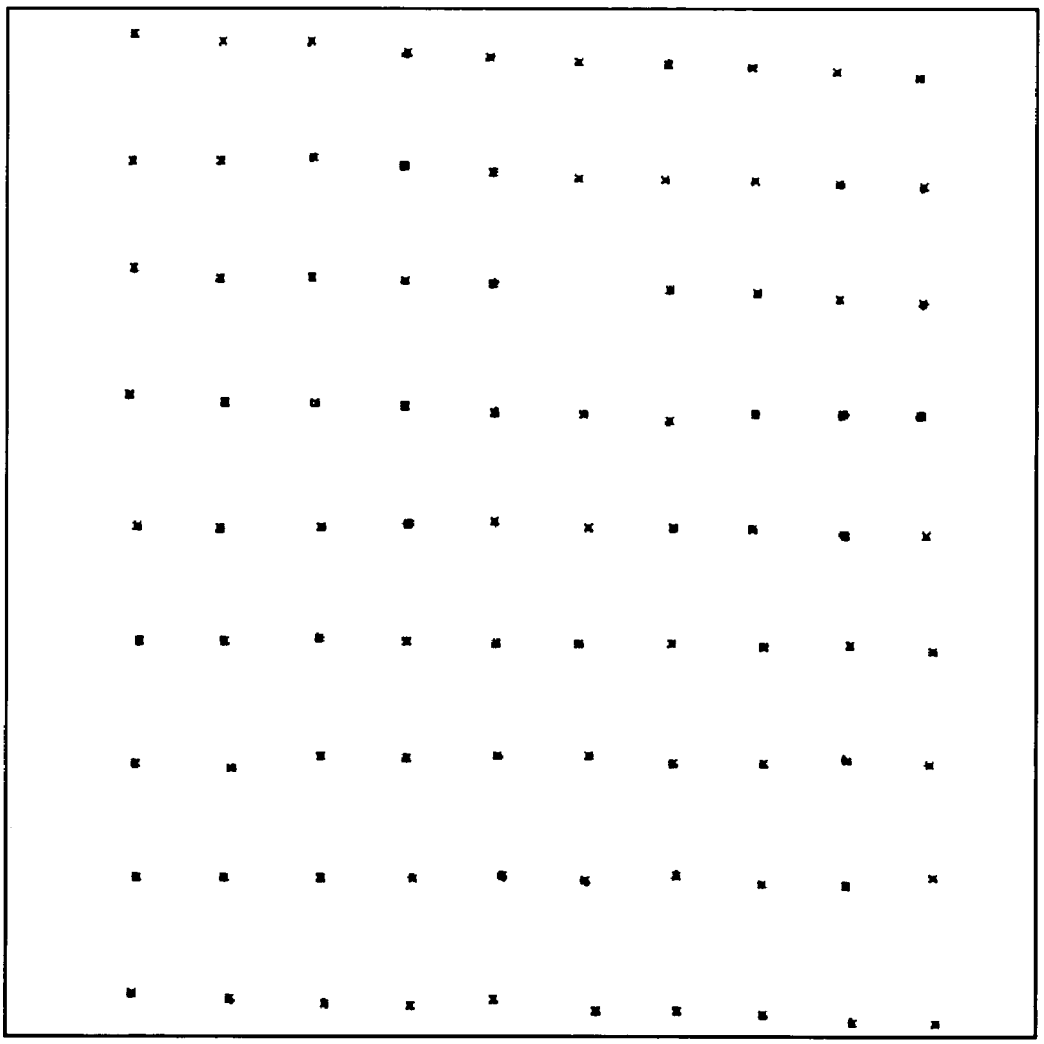
FIG. 7D is an exemplary diagram of results from the software of FIGS. 3 and 7A.

FIG. 7A shows an exemplary flow chart for the blob analysis module 340. First, blobs are identified (step 705). Each contiguous region of pixels with high intensity are grouped together as a blob and assigned a diode index number. Centroids are calculated for the identified blobs (step 710). Each blob's centroid is calculated using, for example, an intensity-weighted centroid estimation scheme. Sample results from the blob analysis module from a raw image are shown in FIGS. 7C and 7D. Pixel coordinates are determined for the blob (step 715). In order to associate the detected centroid with a particular physical diode for coordinate mapping, the centroid coordinate values are rounded off and the diode-index mask is accessed at that pixel location to determine the diode-index number for the detected laser spot. The blob analysis module also discriminates against false detection by converting the apparent position of the detected laser spots to a corresponding physical z coordinate using the calibration curves for z. The mean and standard deviation of the z values detected in each frame are calculated. If the z value lies outside of the mean plus or minus two standard deviations, the occurrence is considered invalid and the detection is removed from the list of valid detections. The blob analysis module also assigns an appropriate diode index number (step 720), using the diode index mask, to each detected, valid laser spot.

The diode-index mask image may be created in a similar way as the ROI mask image, except that any pixel within the user-defined allowed path deviation radius is assigned a value equal to the diode-index number. In such a way, the diode-index number is stored in each diode ROI and can be easily accessed by other modules in the software package.

Coordinate Mapping Module

Figure 8:
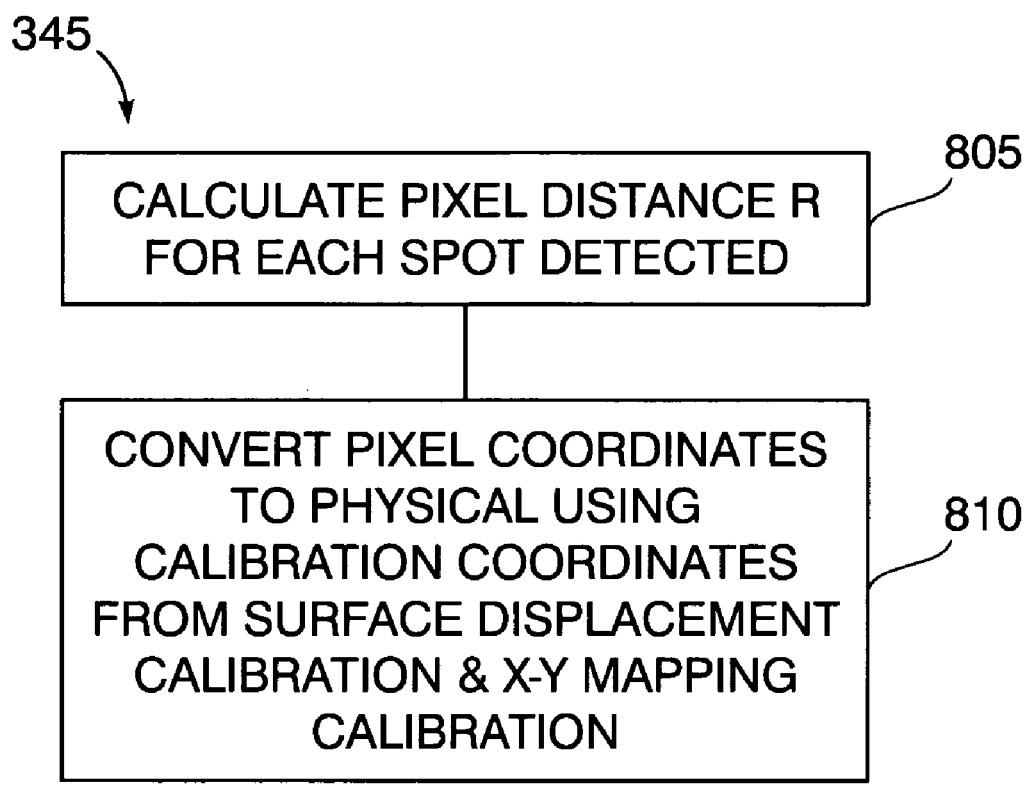
FIG. 8 is an exemplary flow diagram for the coordinate mapping software module of FIG. 3.

FIG. 8 illustrates various aspects of the coordinate mapping module 345. In particular, FIG. 8 shows an exemplary flow chart for the coordinate mapping module 334. Once the diode locations in each image have been identified, each centroid coordinate is assigned a specific diode-index number, and the distance quantity R is determined (step 805) for the detected laser spot using equation (1). Coordinate mapping is then performed by using the calibration curves for ($x_p$, $y_p$, $z_p$), as shown in equations (2)-(4), to calculate the physical location of the water surface in three dimensions (step 810).

Post-Processing Module

Figure 9A:
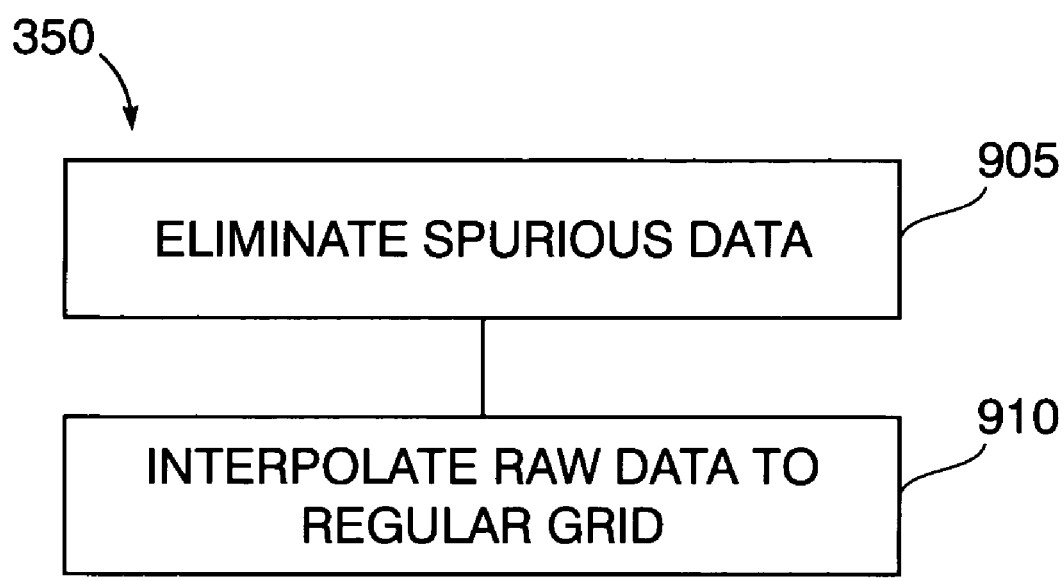
FIG. 9A is an exemplary flow diagram for the post processing module of FIG. 3.
Figure 9B:
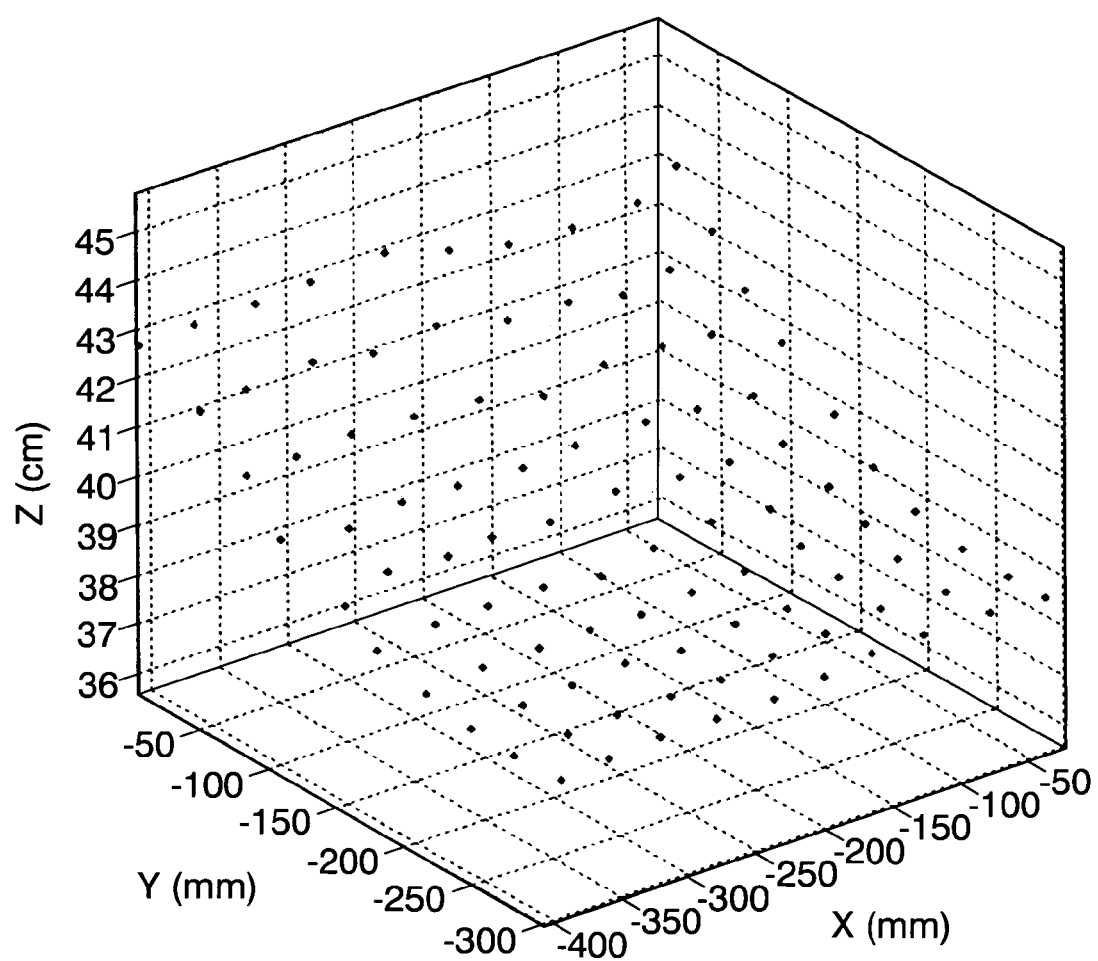
FIG. 9B is a diagram of exemplary output from the software of FIGS. 3 and 9A.
Figure 9C:
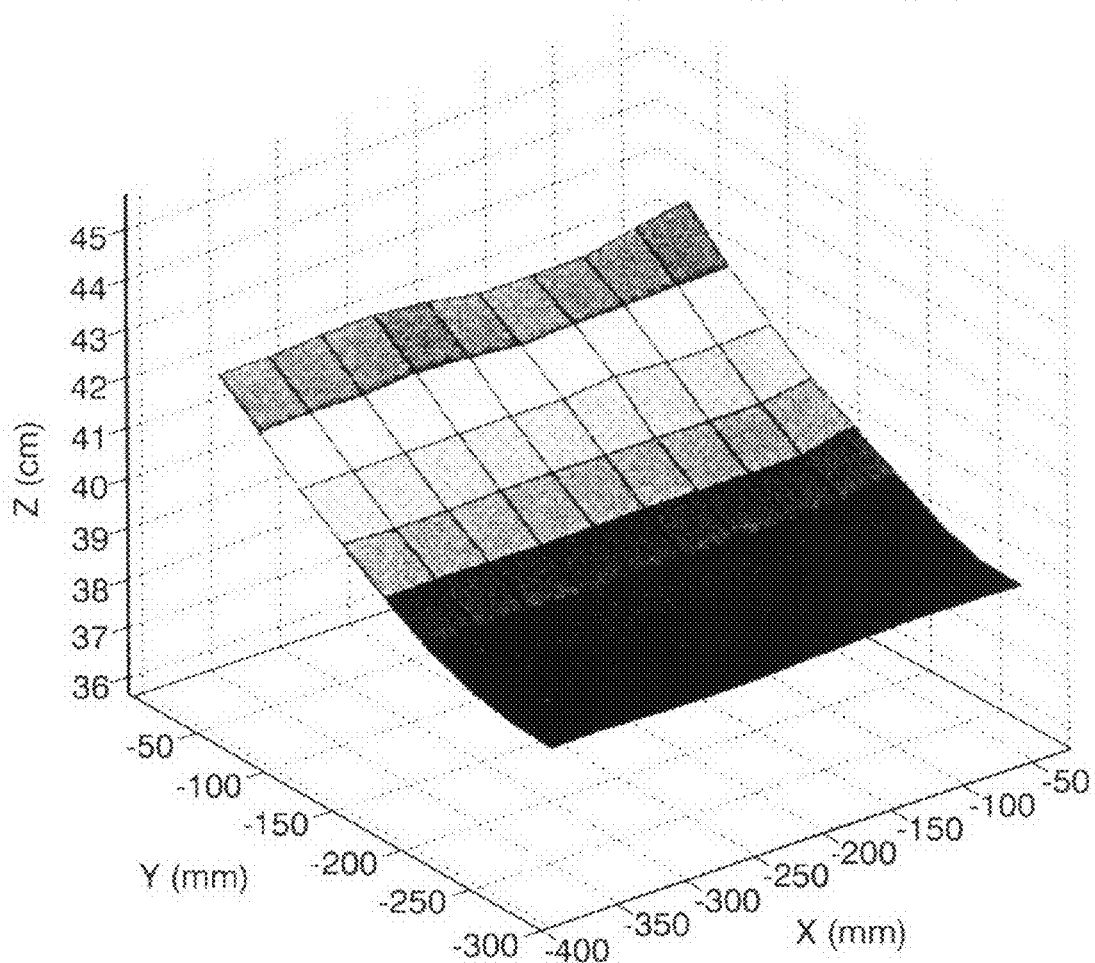
FIG. 9C is a diagram of exemplary output from the software of FIGS. 3 and 9A.
Figure 10A:
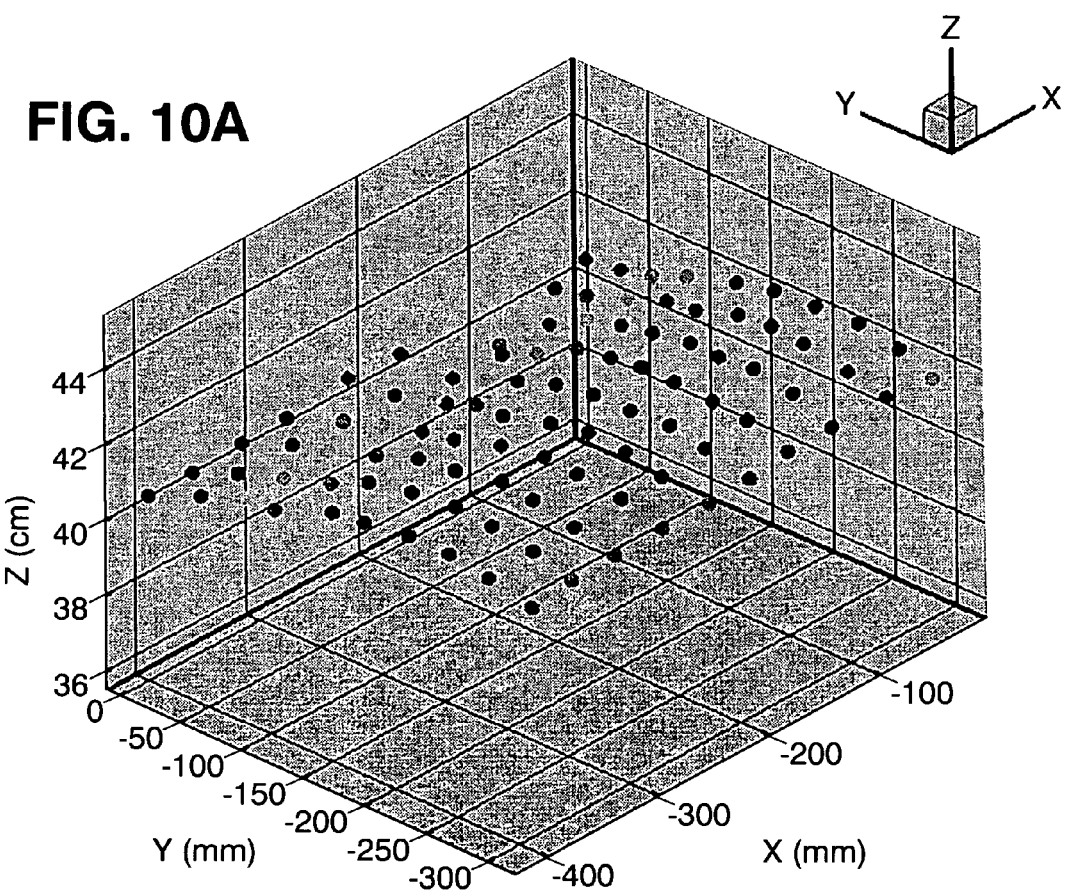
FIG. 10A is a diagram of exemplary output from the software of FIG. 3.
Figure 10B:
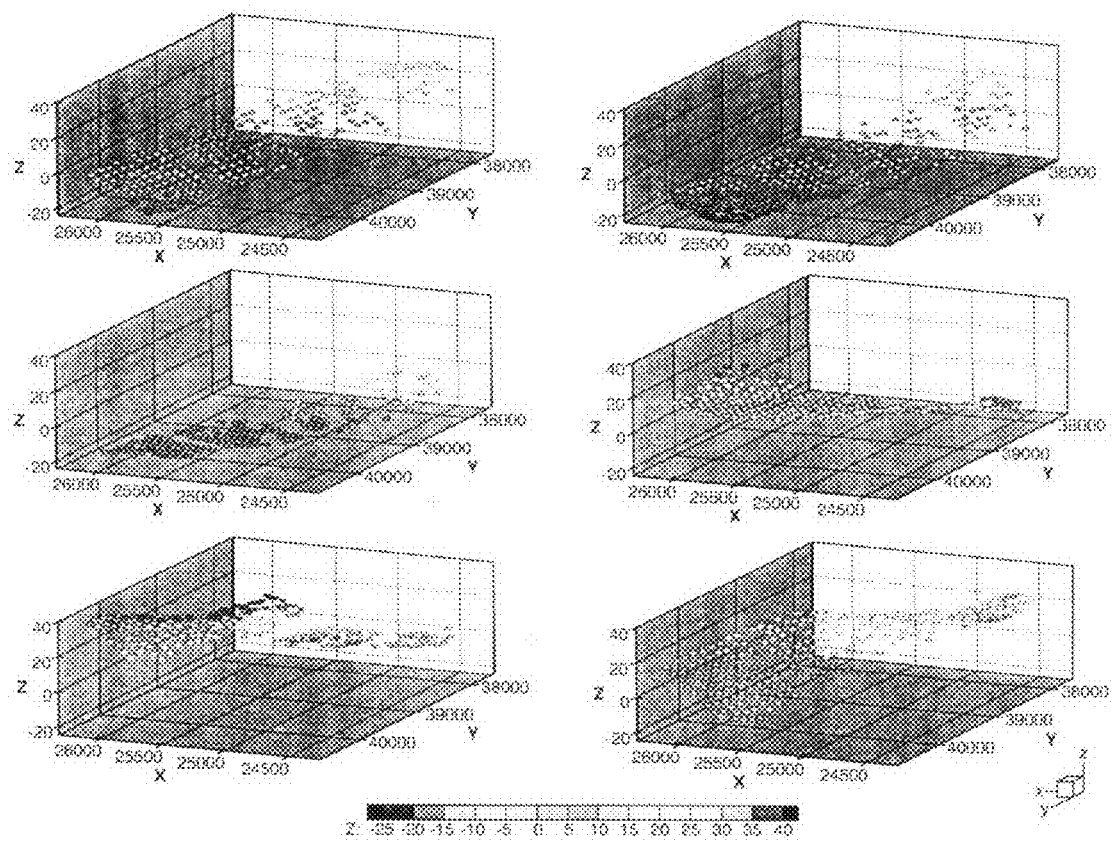
FIG. 10B is a diagram of exemplary output from the software of FIG. 3.

FIGS. 9A, 9B, and 9C, 10A, and 10B illustrate various aspects of the post processing module 350. FIG. 9A shows an exemplary flow chart for the post processing module 350. The output of the coordinate mapping function 345 yields multiple physical coordinates corresponding to the intersection of laser beams with the water surface.

The post-processing module 350 performs the elimination of spurious data points (step 905) on the measured wave surface. In one implementation, a 3×3 validation scheme is used to eliminate spurious data points in the GLRP output. For each point, the average and RMS values of the neighboring 8 points are calculated. If the value of the center point differs from the average value by more than a user-specified multiple of the RMS value, the data point is removed from the data set. Additionally a particle tracking algorithm, which utilizes a priori information from the previous frame, may also be used to determine an expected location for the laser spot in the current frame. If the detected laser spot does not fall within a given search radius of the expected position, the laser spot is disregarded.

The post-processing module 350 also performs optional interpolation of the data to a regular grid (step 910). In one implementation, a surface is fitted through the physical locations using a triangle-based linear interpolation scheme when interpolation is selected. Higher-order fits also may be performed. The interpolation algorithm provides $(x_r, y_r, z_r)$ on a uniform grid, which may be advantageous in comparison to solutions of computational fluid dynamics (CFD) calculations and other analytical methods.

Data Output

FIGS. 9B, 9C, 10A, and 10B illustrate various aspects of the data output by the GLRP process module 310. The converted physical coordinates in $(x_r, y_r, z_r)$ can be output to a data file such as, for example, a .txt data file or a Tecplot-format .plt file. This allows for visualization, analysis, and further postprocessing of the data offline. The GLRP software 300 includes options to combine data from multiple cameras and to perform statistical analyses of the raw data on a point-to-point basis. Sample output plotted in 3-D are shown in FIGS. 9B, 9C, 10A, and 10B.

A number of exemplary implementations have been described. Nevertheless, it will be understood that various modifications may be made. For example, suitable results may be achieved if the steps of described techniques are performed in a different order and/or if components in a described component, system, architecture, or devices are combined in a different manner and/or replaced or supplemented by other components. The described techniques also may be applied to macro solid surface profiling and micro surface profiling. For example, the techniques may be used for the macro solid surface profiling of objects such as ship hulls, large tanks, cylinders, or silos by, for instance, painting or spraying with fluorescent paint or dye. The techniques may be used for micro surface profiling to analyze small surface gradients using, for instance, pinpoint lasers and a high magnification imaging system in applications such as, among other things, quality control analysis for shafts, cylinders, or flat sheets of material that are mass produced. Accordingly, other implementations are within the scope of the following claims.

What is claimed is:

1. A method for obtaining liquid surface profile information, the method comprising:
   recording plural calibration images of a liquid surface, said recording of calibration images including recording at least two said calibration images at different elevations relative to said liquid surface, each said calibration image including plural calibration laser spots projected onto said liquid surface by a stationary device for recording said calibration images;
   performing calibration with respect to said calibration images, each said calibration laser spot being characterized by two apparent coordinates $(x_a, y_a)$ and three physical coordinates $(x_p, y_p, z_p)$, said performing of calibration including performing surface displacement calibration and performing X-Y mapping calibration, said surface displacement calibration being for determining a relationship between said physical coordinate $z_p$ and said apparent coordinates $(x_a, y_a)$, said X-Y mapping calibration being for determining a relationship between said physical coordinates $(x_p, y_p)$ and said apparent coordinates $(x_a, y_a)$, said performing of X-Y mapping calibration including effecting intensity-based centroid estimation to determine the centroid of each said calibration laser spot, said performing of calibration including obtaining three calibration curves for each said calibration laser spot, each said calibration curve representing a second-order polynomial least-squares fit for one of the three said physical coordinates $(x_p, y_p, z_p)$ of a said calibration laser spot;
   recording plural measurement images of said liquid surface, said recording of measurement images being performed in a time-resolved manner whereby said measurement images are time-sequentially recorded of said liquid surface in a dynamically changing condition, each said measurement image including plural measurement laser spots projected onto said liquid surface by a stationary device for recording said measurement images;
   performing data processing with respect to said measurement images, each said measurement laser spot being characterized by said two apparent coordinates $(x_a, y_a)$ and said three physical coordinates $(x_p, y_p, z_p)$, said performing of data processing including effecting intensity-based centroid estimation to determine the centroid of each said measurement laser spot, said performing of data processing further including performing coordinate mapping of said measurement images, said performing of coordinate mapping including applying the corresponding said three calibration curves to each said measurement laser spot so as to transform said apparent coordinates $(x_a, y_a)$ of said measurement laser spot to said physical coordinates $(x_p, y_p, z_p)$ of said measurement laser spot.

2. The method of claim 1 wherein said three calibration curves respectively represent the following three second-order polynomial least-squares fits:

$$z_p = a_0 + a_1 R + a_2 R^2$$

$$x_p = b_0 + b_1 R + b_2 R^2$$

$$y_p = c_0 + c_1 R + c_2 R^2.$$

3. The method of claim 2, the method further comprising generating plural region-of-interest masks, each said region-of-interest mask being associated with a said calibration laser spot, each said region-of-interest mask delimiting a region in which a said measurement laser spot is considered valid.

4. The method of claim 1, the method further comprising generating plural region-of-interest masks, each said region-of-interest mask being associated with a said calibration laser spot, each said region-of-interest mask delimiting a region in which a said measurement laser spot is considered valid.

5. A computer program product, said computer program product being embodied in computer code and being characterized by computer program logic for enabling a computer to obtain liquid surface profile information, said computer code being executable by said computer so that, in accordance with said computer program logic, said computer performs steps including:
   recording plural calibration images of a liquid surface, said recording of calibration images including recording at least two said calibration images at different elevations relative to said liquid surface, each said calibration image including plural calibration laser spots projected onto said liquid surface by a stationary device for recording said calibration images;

performing calibration with respect to said calibration images, each said calibration laser spot being characterized by two apparent coordinates $(x_a, y_a)$ and three physical coordinates $(x_p, y_p, z_p)$, said performing of calibration including performing surface displacement calibration and performing X-Y mapping calibration, said surface displacement calibration being for determining a relationship between said physical coordinate $z_p$ and said apparent coordinates $(x_a, y_a)$, said X-Y mapping calibration being for determining a relationship between said physical coordinates $(x_p, y_p)$ and said apparent coordinates $(x_a, y_a)$, said performing of X-Y mapping calibration including effecting intensity-based centroid estimation to determine the centroid of each said calibration laser spot, said performing of calibration including obtaining three calibration curves for each said calibration laser spot, each said calibration curve representing a second-order polynomial least-squares fit for one of the three said physical coordinates $(x_p, y_p, z_p)$ of a said calibration laser spot;

recording plural measurement images of said liquid surface, said recording of measurement images being performed in a time-resolved manner whereby said measurement images are time-sequentially recorded of said liquid surface in a dynamically changing condition, each said measurement image including plural measurement laser spots projected onto said liquid surface by a stationary device for recording said measurement images;

performing data processing with respect to said measurement images, each said measurement laser spot being characterized by said two apparent coordinates $(x_a, y_a)$ and said three physical coordinates $(x_p, y_p, z_p)$, said performing of data processing including effecting intensity-based centroid estimation to determine the centroid of each said measurement laser spot, said performing of data processing further including performing coordinate mapping of said measurement images, said performing of coordinate mapping including applying the corresponding said three calibration curves to each said measurement laser spot so as to transform said apparent coordinates $(x_a, y_a)$ of said measurement laser spot to said physical coordinates $(x_p, y_p, z_p)$ of said measurement laser spot.

6. The computer program product of claim 5 wherein said three calibration curves respectively represent the following three second-order polynomial least-squares fits:

$$z_p = a_0 + a_1 R + a_2 R^2$$

$$x_p = b_0 + b_1 R + b_2 R^2$$

$$y_p = c_0 + c_1 R + c_2 R^2.$$

7. The computer program product of claim 6, the method further comprising generating plural region-of-interest masks, each said region-of-interest mask being associated with a said calibration laser spot, each said region-of-interest mask delimiting a region in which a said measurement laser spot is considered valid.

8. The computer program product of claim 5, the method further comprising generating plural region-of-interest masks, each said region-of-interest mask being associated with a said calibration laser spot, each said region-of-interest mask delimiting a region in which a said measurement laser spot is considered valid.

* * * * *